United States Patent
Sekiguchi

(10) Patent No.: US 6,529,255 B1
(45) Date of Patent: Mar. 4, 2003

(54) LIQUID CRYSTAL DISPLAY PANEL

(75) Inventor: Kanetaka Sekiguchi, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/571,557

(22) Filed: May 16, 2000

Related U.S. Application Data

(62) Division of application No. 08/961,153, filed on Oct. 30, 1997, now Pat. No. 6,084,650.

(30) Foreign Application Priority Data

| Apr. 14, 1995 | (JP) | 7-88942 |
| Jul. 10, 1997 | (JP) | 9-185312 |
| Sep. 10, 1997 | (JP) | 9-245278 |

(51) Int. Cl.$^7$ ............... G02F 1/1335; G02F 1/1345
(52) U.S. Cl. .................. 349/113; 349/106; 349/143
(58) Field of Search ............................ 349/106, 113, 349/182, 183, 165, 195

(56) References Cited

U.S. PATENT DOCUMENTS

| 3,932,024 A | * | 1/1976 | Yaguchi et al. | 349/113 |
| 4,935,757 A | | 6/1990 | Hatano et al. | 350/336 |
| 4,946,259 A | | 8/1990 | Matino et al. | 350/339 |
| 5,122,891 A | * | 6/1992 | Kim | 349/106 |
| 5,229,873 A | * | 7/1993 | Hirose et al. | 349/130 |
| 5,309,264 A | * | 5/1994 | Lien et al. | 349/130 |
| 5,317,437 A | | 5/1994 | Katakura | 359/54 |
| 5,365,357 A | | 11/1994 | Ohgawara et al. | 359/67 |
| 6,031,592 A | * | 2/2000 | Shibahara | 349/113 |
| 6,144,429 A | * | 11/2000 | Nakai et al. | 349/113 |

* cited by examiner

*Primary Examiner*—Toan Ton
(74) *Attorney, Agent, or Firm*—Armstrong, Westerman & Hattori LLP

(57) ABSTRACT

A liquid crystal display panel has a first substrate and a second substrate composed of a transparent material and disposed opposite each other across a gap, display electrodes provided on one of the opposed surfaces of the first and second substrates, transparent counter electrodes provided on the other opposed surface, a region between each display electrode and an opposed counter electrode constituting a pixel region, a liquid crystal layer filled in the gap between the first substrate and the second substrate, and a color filter or a reflecting film provided at each pixel region. The color filter or the reflecting film at each pixel region is disposed as divided into multiple segments and light transmitting portions are provided around the color filter or reflecting film. Otherwise each color filter or reflecting film is partially provided with multiple openings or other portions with high light transmittance.

12 Claims, 15 Drawing Sheets

F I G. 2 1
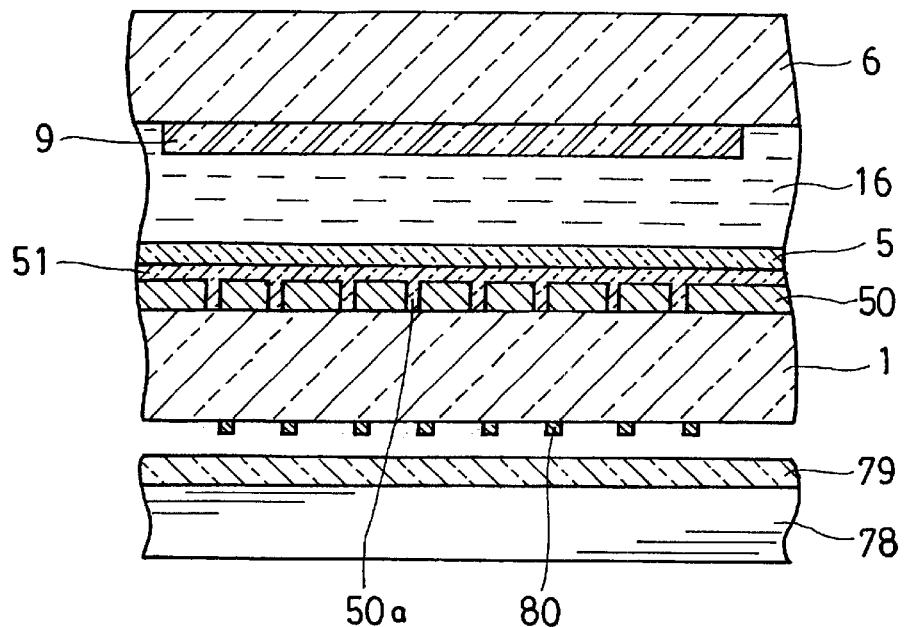
F I G. 2 2
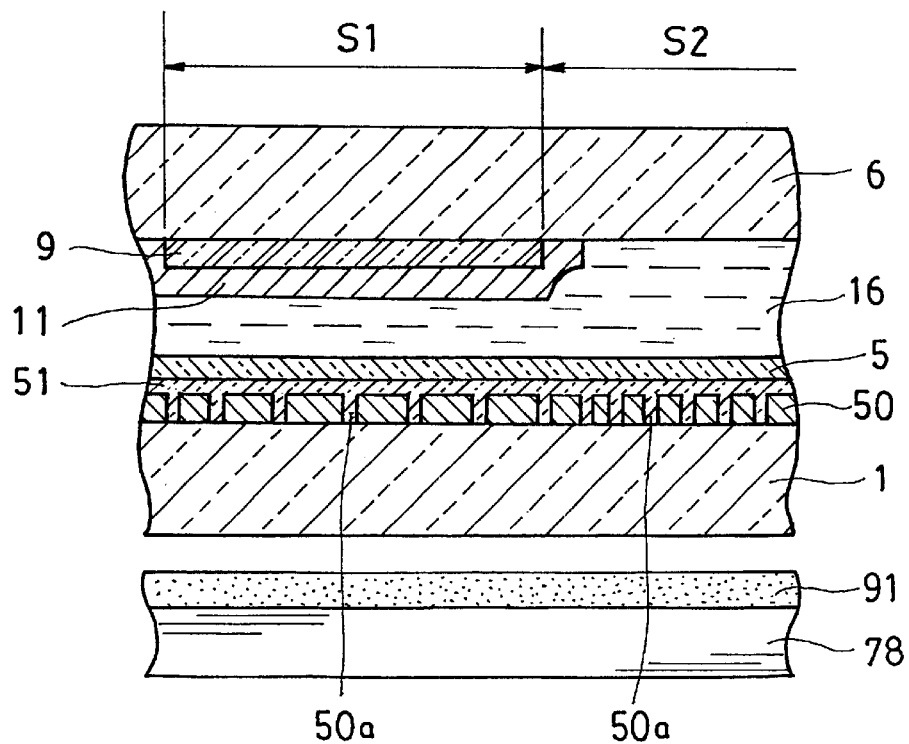

LIQUID CRYSTAL DISPLAY PANEL

This application is a division of prior application Ser. No. 08/961,153 filed Oct. 30, 1997, now U.S. Pat. No. 6,084,650.

BACKGROUND OF THE INVENTION

1. Field of the Invention

This invention relates to a liquid crystal display panel for a liquid crystal display device of the type used extensively in various apparatuses such as watches and hand-held calculators, particularly to a liquid crystal display panel that has color filters or a reflecting films or whose liquid crystal layer consists of a mixture of a liquid crystal and a polymer obtained by imparting a crosslinked structure to a monomer by ultraviolet light exposure.

2. Description of the Related Art

A liquid crystal display panel is constituted by disposing two glass panels or other transparent material substrates to oppose each other across a gap, providing one of the opposed substrate surfaces with multiple display electrodes and the other with multiple transparent counter electrodes to form a large number of pixel regions in matrix arrangement between the display electrodes and the counter electrodes, and filling a liquid crystal layer between the two substrates.

Images are displayed by selectively applying voltages between the display electrodes and the counter electrodes of the individual pixel regions so as to modify an optical characteristic of the intervening liquid crystal.

In the simplest structure of this type of liquid crystal display panel, the signal electrodes for inputting the display signal also serve as the display electrodes and a simple matrix of pixel regions is formed at the intersections between the signal electrodes and the counter electrodes. A multiplex drive system is adopted.

Most liquid crystal display panels in use today are of the active matrix type in which a display electrode is formed separately of the signal electrode at each picture element and a switching element is provided between each signal electrode and the associated display electrode.

Switching elements fall in two general categories, the three-terminal type using a thin film transistor (TFT) and the two-terminal type using a non-linear resistance element. A diode, varistor, thin film diode (TFD) or the like is used as the non-linear resistance element.

In addition, wide use is being made of color liquid crystal panels having color filters of three colors on one of the substrates and reflective liquid crystal display panels having a reflecting film on one of the substrates. Moreover, a liquid crystal display panel has been developed that uses a liquid crystal layer consisting of a mixture of a liquid crystal and a polymer obtained by crosslinking a monomer by exposure with ultraviolet light.

The liquid crystal display device using this type of liquid crystal display panel has the advantage of consuming much less power than other display devices.

While it is therefore used extensively as the display device of various kinds of equipment, particularly portable equipment, the display capacity of the liquid crystal display panel has increased steadily in recent years.

At the same time, demand for brighter displays has made it necessary to enhance the transmittance of the individual pixel regions and to increase the aperture ratio, i.e., the ratio of the pixel regions to the gaps between the pixel regions (non-display regions).

Although an attempt has also been made to increase display luminance by utilizing difference of refractive index in liquid crystal, this leads to change in hue depending on the positional relationship between the liquid crystal display panel and the observer and the relationship between the position of the pixel regions and the observer.

An example of the structure of a conventional color liquid crystal display panel using two-terminal type non-linear resistance elements will now be explained with reference to FIGS. 29 and 30.

FIG. 29 is an enlarged partial plan view of the liquid crystal display panel. For ease of illustration, some elements such as the second substrate, an insulated protection layer and an alignment film are omitted and lower members among members that overlap in the vertical direction are also indicated by solid lines in the plan views. FIG. 30 is an enlarged sectional view taken along line A—A in FIG. 29.

The first substrate 1 and the second substrate 6 shown in FIG. 30 are transparent substrates such as glass panels. They are disposed opposite and parallel to each other.

A large number of signal electrodes 2 made of tantalum (Ta) film are formed on the first substrate 1 in the pattern of regularly spaced strips, as shown in FIG. 29. Each signal electrode 2 is integrally formed at regular intervals along its longitudinal direction with laterally projecting first electrodes 2a. A non-linear resistance layer 3 made of tantalum oxide ($Ta_2O_5$), an anodic oxide film of the signal electrode 2, is provided on each signal electrode 2 and its first electrodes 2a.

Second electrodes 4 made of chromium (Cr) film are provided to overlap the non-linear resistance layer 3, thereby constituting non-linear resistance elements 10.

A large number of reflecting film display electrodes 15 made of aluminum (Al) are formed on the first substrate 1 in a closely spaced matrix arrangement. Portions of the second electrodes 4 make contact with the display electrodes 15. As shown in FIG. 29, the first electrodes 2a and the display electrodes 15 are separated by a prescribed distance. Each display electrode 15 is disposed in alignment with a counter electrode 9 across an intervening liquid crystal layer 16 to constitute a pixel region 19 of the liquid crystal display panel.

On the other hand, as indicated by the oblique lines in FIG. 29, a two-layer black matrix 7 composed of a chromium oxide (CrO) film and a chromium (Cr) film is formed in a cross stripes pattern on the surface of the second substrate 6 opposed to the first substrate 1. The black matrix 7 serves as a light-shielding film for preventing light leakage from the gaps between the display electrodes 15 formed on the first substrate 1.

Color filters 11, 12 and 13 that partially overlie the black matrix 7 are provided on the second substrate 6 at regions opposite the display electrodes 15 (regions completely covering the pixel regions 19). These filters 11, 12 and 13 are of three colors: blue (B), red (R) and green (G).

The counter electrodes 9 are further provided on the second substrate 6 as strips of indium-tin-oxide (ITO) film, which is transparent and conductive, running perpendicular to the signal electrodes 2 so as each to oppose one column of the display electrodes 15. Data electrodes (not shown) are connected to the counter electrodes 9 for applying signals from an external circuit. Transparent and insulated protection layers 8 are provided between the counter electrodes 9 and the color filters 11, 12 and 13.

The opposed inner surfaces of the first substrate I and the second substrate 6 are provided with alignment films 21A, 21B as processed layers for regularly aligning the molecules of the liquid crystal.

A prescribed spacing is maintained between the first substrate 1 and the second substrate 6 by means of spacers 17. The liquid crystal layer 16 is filled in the intervening gap. A polarization film 18A is disposed on the outer (lower) surface of the first substrate 1 and a polarization film. 18B is disposed on the outer (upper) surface of the second substrate 6.

Since this liquid crystal display panel is not self-illuminating, it uses the external light 28 (natural or artificial light) from the side of the second substrate 6 for display.

Specifically, an optical characteristic of the liquid crystal in the regions between the display electrodes 15 and the counter electrodes 9 is modified via the non-linear resistance elements 10 by selectively applying driving voltages produced by an external circuit across the signal electrodes 2 and (via the data electrodes) the counter electrodes 9. By this, display of a desired image can be effected by using the modification of the liquid crystal optical characteristic (including, for example, rotation of the major axes of the liquid crystal molecules) to control the exiting, through different ones of the color filters 11, 12 and 13 and the polarization film 18B, of the external light entering the liquid crystal display panel through the polarization film 18B from the side of the second substrate 6 and reflected by the display electrodes 15.

In this type of color liquid crystal display panel, the color filters 11, 12 and 13 provided at the individual pixel regions 19 are one-piece filters each covering the whole of one pixel region 19. In addition, the color filters 11, 12 and 13 partially overlap the black matrix 7 provided at the peripheral portions of the pixel regions 19.

This means that all of the external light 28 entering the liquid crystal display panel passes through different ones of the color filters and that all of the light reflected by the display electrodes 15 exits through different ones of the color filters.

The display therefore exhibits good color purity. On the other hand, however, since the light transmittance of the color filters is only around 60–70% and the light has to pass through the color filters twice before exiting, the amount of exiting light, i.e., the amount of light contributing to the display, is considerably reduced relative to the amount of incident light. The display is proportionally dark.

Moreover, in order to obtain a visible display even when the external light 28 is weak, it is desirable to dispose an auxiliary light source on the side (on the rear side) of the first substrate 1 opposite from that formed with the display electrodes 15. Even if such an auxiliary light source is provided, however, the illumination it provides from the rear surface of the liquid crystal display panel cannot enable an acceptably visible display since almost all of the incident light from the auxiliary light source is blocked by the reflecting films constituting the display electrodes 15.

The display luminance of the conventional color liquid crystal display panel is therefore low and the displayed image becomes substantially unrecognizable when the external light is weak. In addition, the degree to which an auxiliary light source can be used to overcome this problem is extremely limited owing to the color filters provided on the side of one substrate and the reflecting films provided as the display electrodes on the side of the other substrate.

The luminance of an active matrix type liquid crystal display panel having non-linear resistance elements is still lower than that of a simple matrix type liquid crystal display panel in which the intersection regions between the counter electrodes and the signal electrodes constitute the pixel regions, because the regions formed with the non-linear resistance elements block the passage of light.

Moreover, when a polymer dispersive liquid crystal composed of a liquid crystal-polymer mixture is to be used as the liquid crystal layer, the monomer of the liquid crystal layer 16 shown filled in the gap between the first substrate 1 and the second substrate 6 in FIG. 30 has to be exposed with ultraviolet light from the side of the first substrate 1 or the second substrate 6 in order to effect the crosslinking reaction needed to obtain a polymer with a crosslinked structure. However, almost no irradiation with ultraviolet light is possible from the side of the first substrate 1, since most of the first substrate 1 is formed with the reflecting films constituting the display electrodes 15. On the other hand, efficient exposure of the liquid crystal layer 16 with ultraviolet light is impossible from the side of the second substrate 6 since the ultraviolet light (wavelength: 300–400 nm) is absorbed by the color filters 11, 12 and 13 provided on the second substrate 6, particularly by the blue color filter 11, which passes almost no ultraviolet light.

Irradiation with ultraviolet light is also required when using a liquid crystal layer composed of a mixture of a polymer dispersive liquid crystal and a dye. Efficient exposure of the liquid crystal layer with ultraviolet light is also impossible in this case.

SUMMARY OF THE INVENTION

This invention was accomplished to overcome these problems. The object of the invention is to enable even a liquid crystal display panel having a color filter and/or a reflecting film on its pixel regions to achieve enhanced light transmittance and a bright display and also enable it to effect display with good efficiency by use of an auxiliary light source under condition of insufficient external light.

Another object of the invention is to enable a liquid crystal layer filled between two substrates to be efficiently exposed with ultraviolet light so that a polymer can be readily subjected to a crosslinking reaction for obtaining a polymer with a crosslinked structure in the case of using a liquid crystal layer composed of a polymer dispersive liquid crystal that is a mixture of liquid crystal and a polymer.

This invention achieves this object by providing a liquid crystal display panel having a first substrate and a second substrate composed of a transparent material and disposed opposite each other across a gap, multiple display electrodes provided on one of the opposed surfaces of the first and second substrates, multiple transparent counter electrodes provided on the other opposed surface, a region between each display electrode and an opposed counter electrode constituting a pixel region, and a liquid crystal layer filled in the gap between the first substrate and the second substrate, the liquid crystal display panel comprising a color filter or a reflecting film provided at each pixel region, the area of the color filter or the reflecting film at each pixel region being made smaller than the area of a single pixel region to leave a light transmitting portion around each color filter or reflecting film.

The color filter or the reflecting film at each pixel region is preferably divided into multiple segments.

The color filters or reflecting films provided at the pixel regions can have portions whose light transmittance is higher than other portions thereof.

In this case, the portions whose light transmittance is high are preferably multiple openings in the color filters or the reflecting films. The openings can be filled with transparent members.

Despite the fact that absorption of light by the color filters and/or blocking of light by the reflecting films occurs in the liquid crystal display panel of this configuration, the light transmitting portions surrounding, or the portions with high light transmittance within, the color filters and/or the reflecting films pass light with substantially no attenuation. The external light and the light from the auxiliary light source can therefore be effectively utilized to enable the liquid crystal display panel to provide a bright overall display.

Color filters and/or reflecting films having the aforesaid high transmittance portions can also be provided at non-display regions, i.e., regions apart from the pixel regions of the liquid crystal display panel, and the density of these high transmittance portions be made higher than that of high transmittance portions of the color filters and/or reflecting films provided at the pixel regions. This enables efficient utilization also of the light falling incident on the non-display regions.

When the opposed inner surfaces of the first substrate and the second substrate are each provided with alignment layers having different orientation characteristics, the alignment layers provided at the high transmittance portions of the color filters and/or the reflecting films and the alignment layers provided at other portions preferably have different orientation characteristics. This makes the high transmittance portions less conspicuous when the pixel regions are in the display state.

The invention further provides a liquid crystal display panel whose substrate formed with display electrodes is provided on the side thereof formed with the display electrodes with a first reflecting film locally provided with one or more light transmitting portions for transmitting light and is provided on the opposite side thereof from that formed with the display electrodes with a second reflecting film in a pattern corresponding to that of the light transmitting portions.

In this case, the positions of the light transmitting portions of the first reflecting film and the positions of the second reflecting film can be somewhat out of true alignment via the substrate.

This enables a further enhancement of display luminance because the external light that passes through the light transmitting portions without being reflected by the first reflecting film is reflected by the second reflecting film and passes back through the light transmitting portions of the first reflecting film into the liquid crystal layer where it can be effectively utilized.

Color filters having the surrounding or internal light transmitting portions can be provided on one of the first substrate and the second substrate and reflecting films having surrounding or internal light transmitting portions can be provided on the other substrate.

In this case, the light transmitting portions of the color filters and the light transmitting portions of the reflecting films are preferably arrayed at different positions of the pixel regions. This enables the light entering through the light transmitting portions of the color filters to be effectively reflected by the reflecting films. Only the color filters or only the reflecting films can be provided.

When the liquid crystal layer in these liquid crystal display panels is a layer composed of a mixture of a liquid crystal and a polymer obtained by imparting a crosslinked structure to a monomer by irradiation with ultraviolet light, the irradiation can be effected easily and efficiently. In this case, the liquid crystal layer can include a dye.

The above and other objects, features and advantages of the invention will be apparent from the following detailed description which is to be read in conjunction with the accompanying drawings.

BRIEF DESCRIPTION OF THE DRAWINGS

FIGS. 21 to 24 are enlarged partial sectional views of liquid crystal display panels that are eighth to eleventh embodiments of the invention.

DETAILED DESCRIPTION OF THE PREFERRED EMBODIMENTS

Preferred embodiments of the invention will now be explained with reference to the drawings.

For ease of illustration, some elements that would appear in complete drawings of the embodiments are omitted from the attached plan views and most lower elements among elements that overlap in the vertical direction are also indicated by solid lines in the plan views.

Figure 1:
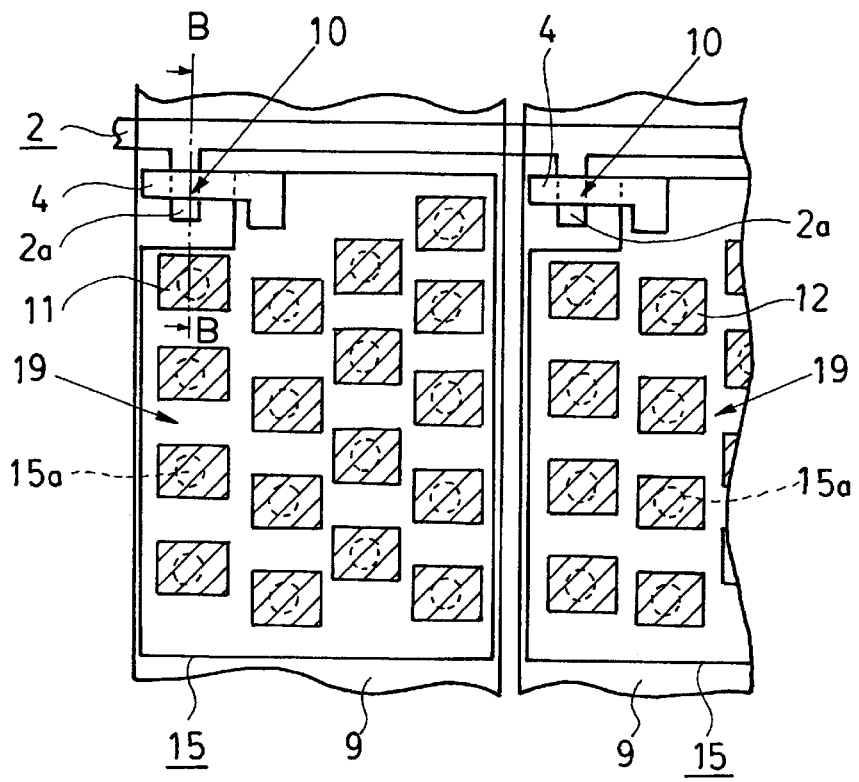
FIG. 1 is an enlarged partial plan view of a liquid crystal display panel that is a first embodiment of the invention and FIG. 2 is an enlarged sectional view taken along line B—B in FIG. 1.
Figure 2:
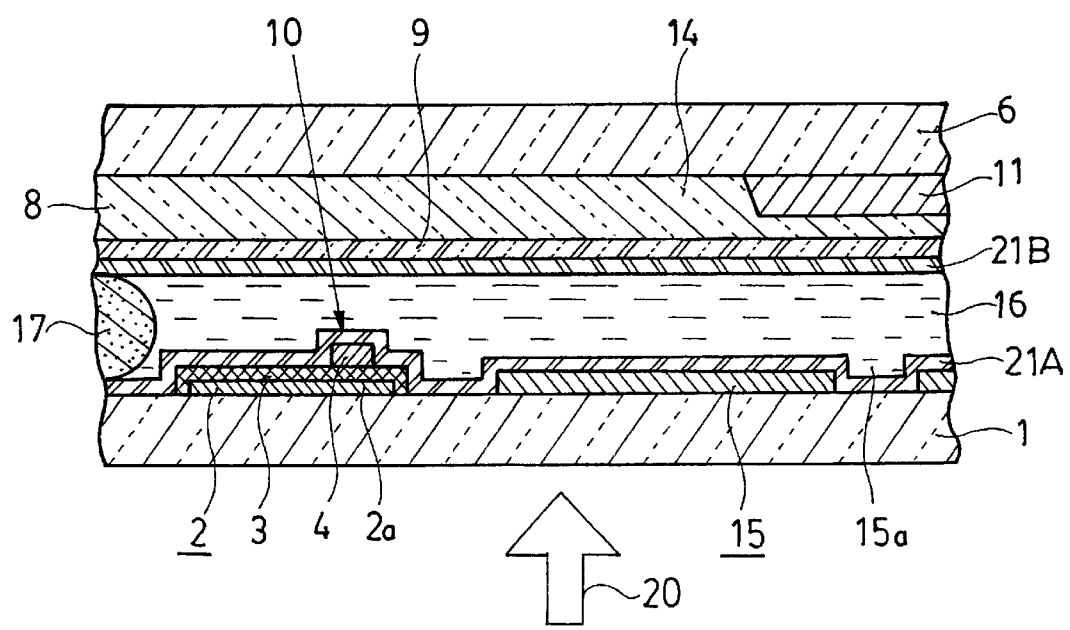

First Embodiment: FIGS. 1 and 2

A liquid crystal display panel that is a first embodiment of the invention will be explained with reference to FIGS. 1 and 2.

Figure 29:
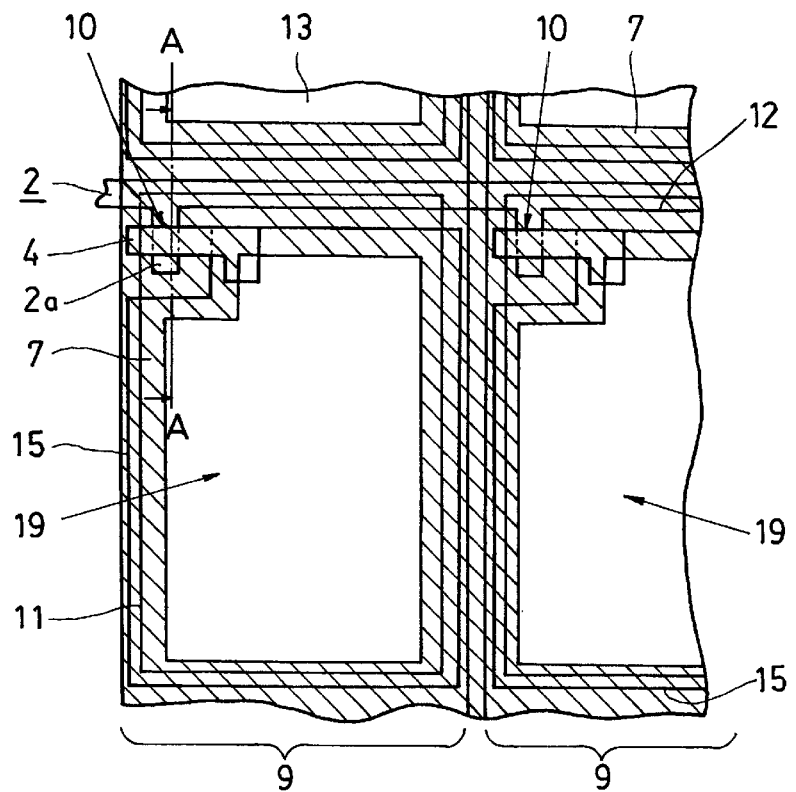
FIG. 29 is an enlarged partial plan view of a conventional liquid crystal display panel and FIG. 30 is an enlarged sectional view taken along line A—A in FIG. 29.
Figure 30:
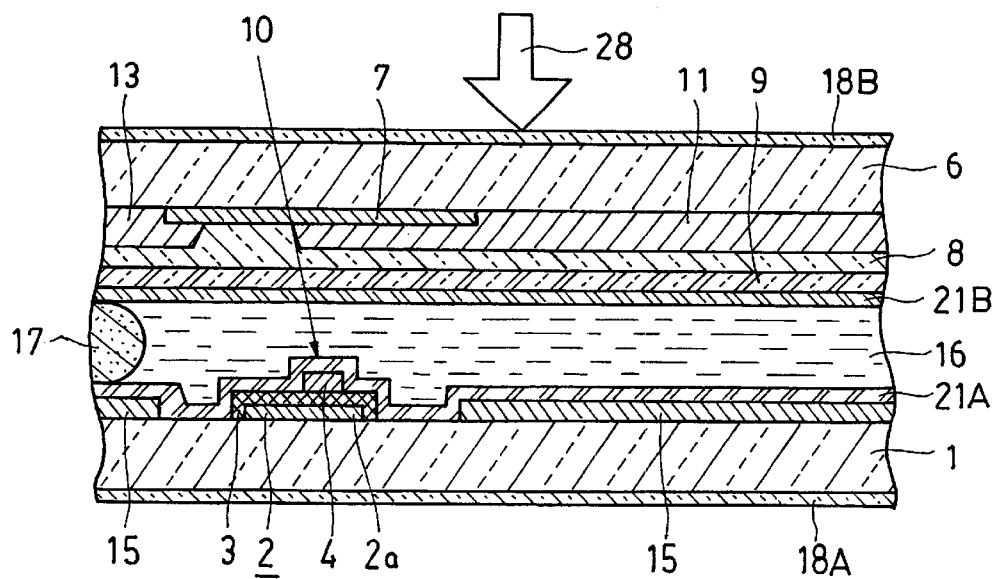

Like the conventional color liquid crystal display panel explained with reference to FIGS. 29 and 30, this liquid crystal display panel is also a reflection-type color liquid crystal display panel. However, it is unlike the conventional color liquid crystal display panel in certain aspects, including that it is not provided with polarization films or a black matrix and that its color filters and display electrodes constituted as reflecting films are differently configured.

The first substrate 1 and the second substrate 6 shown in FIG. 2 are made of a transparent material such as glass. They are disposed in parallel to face each other across a small gap.

A large number of signal electrodes 2 made of tantalum (Ta) film are formed on the first substrate 1 in the pattern of regularly spaced strips, as shown in FIG. 1. Each signal electrode 2 is integrally formed at regular intervals along its longitudinal direction with laterally (downwardly in FIG. 1) projecting first electrodes 2a. A non-linear resistance layer 3 made of tantalum oxide ($Ta_2O_5$), an anodic oxide film of the signal electrode 2, is provided on the surface of each signal electrode 2 and its first electrodes 2a.

Second electrodes 4 made of chromium (Cr) film are provided to overlap the non-linear resistance layer 3 of each first electrode 2a, thereby constituting non-linear resistance elements 10.

A large number of display electrodes 15 constituted as reflecting films made of aluminum (Al) are formed on the first substrate 1 in a closely spaced matrix arrangement. Portions of the second electrodes 4 make contact with the display electrodes 15. As shown in FIG. 1, the first electrodes 2a and the display electrodes 15 are separated by a prescribed distance. Each display electrode 15 is disposed in alignment with a counter electrode 9 across an intervening liquid crystal layer 16 (explained later) to constitute a pixel region 19 of the liquid crystal display panel.

The display electrodes 15 constituted as reflecting films are formed with large numbers of round openings 15a constituting high light transmittance portions.

The surface of the second substrate 6 opposed to the first substrate is provided at regions thereof lying opposite the display electrodes 15 with color filters 11, 12 and 13 (no color filter 13 is shown). These filters 11, 12 and 13 are of three colors: blue (B), red (R) and green (G).

In each region corresponding to a display electrode 15, the color filter 11, 12 or 13 is divided into multiple island-like color filter segments (17 segments in the example of FIG. 1). In each pixel region 19, the area occupied by the color filter (the total area of the color filter segments) is smaller than the area of a single pixel region 19. The regions enclosing the segments of the color filters 11, 12 and 13 exhibit no filtering action and constitute light transmitting portions 14 that pass light with substantially no attenuation.

Although the color filter segments are shown to be aligned vertically and staggered laterally in FIG. 1, they can instead be aligned laterally and staggered vertically or be staggered both vertically and laterally.

In each pixel region 19, the openings 15a of the display electrode 15 are arrayed to fall at different positions from the light transmitting portion 14. In this embodiment, the openings 15a of the display electrodes 15 are formed at positions opposite the segments of the color filters 11, 12 and 13. When the openings 15a are arrayed in this manner, the light entering through the light transmitting portion 14 is efficiently reflected by the display electrode 15 to heighten its rate of utilization as display light.

The counter electrodes 9 are further provided on the second substrate 6 as strips of indium-tin-oxide (ITO) film, which is transparent and conductive, running perpendicular to the signal electrodes 2 so as each to oppose one column of the display electrodes 15. Data electrodes (not shown) are connected to the counter electrodes 9 for applying signals from an external circuit.

Transparent and insulated protection layers 8 are provided between the counter electrodes 9 and the color filters 11, 12 and 13 and at the light transmitting portions 14.

The opposed inner surfaces of the first substrate 1 and the second substrate 6 are provided with alignment films 21A, 21B as processed layers for regularly aligning the molecules of the liquid crystal.

A prescribed spacing is maintained between the first substrate 1 and the second substrate 6 by means of spacers 17. The liquid crystal layer 16 is filled in the intervening gap.

The liquid crystal layer 16 is a mixed liquid crystal layer consisting of a liquid crystal and a monomer. Upon exposure with ultraviolet light, it undergoes a monomer-to-polymer crosslinking reaction. A light-scattering property arises owing to the difference between the refractive indices of the liquid crystal and the polymer of crosslinked structure. Provision of polarization films on the outer surfaces of the first and second substrates 1 and 6 is therefore unnecessary in this embodiment.

Since this liquid crystal display panel is not self-illuminating, it uses mainly the external light (natural or artificial light) from the side of the second substrate 6 for display but is also provided on the rear side of the first substrate 1 with an auxiliary light source.

When the liquid crystal display panel is used for display, an optical characteristic of the liquid crystal in the regions between the display electrodes 15 and the counter electrodes 9 is modified via the non-linear resistance elements 10 by selectively applying driving voltages produced by an external circuit across the signal electrodes 2 and the counter electrodes 9 via the data electrodes. By this, display of a desired image can be effected by using the modification of the liquid crystal optical characteristic (change in light transmittance owing to scattering property) to control the exiting, through different ones of the color filters 11, 12 and 13 and the light transmitting portions 14, of the external light entering the liquid crystal display panel from the side of the second substrate 6 and reflected by the display electrodes 15.

Since at this time external light not only enters and exits the liquid crystal display panel through the color filters 11, 12 and 13 but also enters and exits through the light transmitting portions 14, which are substantially free of light attenuation, a bright color display is possible.

When display is effected in a dark place with no illumination by external light from the side of the second substrate 6, the auxiliary light source (not shown) can be turned on to illuminate the first substrate 1 from the rear side with auxiliary light 20 that enters the liquid crystal display panel through the openings 15a of the display electrodes 15 to effect display by utilizing changes in an optical characteristic of the liquid crystal layer 16.

In this case, since the auxiliary light exiting to the exterior of the second substrate 6 of the liquid crystal display panel (to the observer side) not only passes through the color filters 11, 12 and 13 but also passes through the surrounding light transmitting portions 14, a bright color display is possible.

In addition, since the light transmitting portions 14 surrounding the segments of the color filters 11, 12 and 13 are provided over the pixel regions 19 and the portions of the liquid crystal layer 16 corresponding to the light transmitting portions 14 can be applied with voltage to modify an optical characteristic thereof in the same manner as at the portions where the color filters are present, the provision of the light transmitting portions 14 causes substantially no reduction of the contrast ratio.

When the mixed liquid crystal layer composed of a liquid crystal and a monomer filled in the gap between in the first and second substrates 1 and 6 is exposed with ultraviolet light to obtain the liquid crystal layer 16 composed of a mixture of the liquid crystal and a polymer of crosslinked structure, the exposure with the ultraviolet light can be effected readily with good efficiency.

Specifically, the openings 15a of the display electrodes 15 exhibit high transmittance when the ultraviolet light irradiation is effected from the side of the first substrate 1 and the light transmitting portions 14 provided around the segments of the color filters 11, 12 and 13 exhibit high transmittance when the ultraviolet light irradiation is effected from the side of the second substrate 6. Exposure of the liquid crystal layer 16 with ultraviolet light can therefore be effected efficiently from the side of either the first or second substrate 1 or 6.

Thus, according to the first embodiment explained in the foregoing, a liquid crystal display panel can be obtained that has bright display characteristics by external light and auxiliary light, and, moreover, exposure of the liquid crystal layer 16 with ultraviolet light can be effected easily with good efficiency.

Further, by use of the light transmitting portions 14 provided around the color filter segments at locations differing from those of the openings 15a of the display electrodes 15, exposure with ultraviolet light can be thoroughly effected also at regions where the exposure is insufficient by only the irradiation with ultraviolet light through the openings 15a of the display electrodes 15. This is very effective for a liquid crystal display panel using a liquid crystal layer requiring exposure with ultraviolet light.

In this embodiment, the display electrodes 15 constituted as reflecting films have the same area as the pixel regions 19 and are provided with multiple openings 15a as high light transmittance portions. However, it is also possible to provide the display electrode within each pixel region 19 by dividing it into multiple segments but leaving local portions for electrical interconnection among the segments and to provide light transmitting portions around the display electrodes segments.

Figure 3:
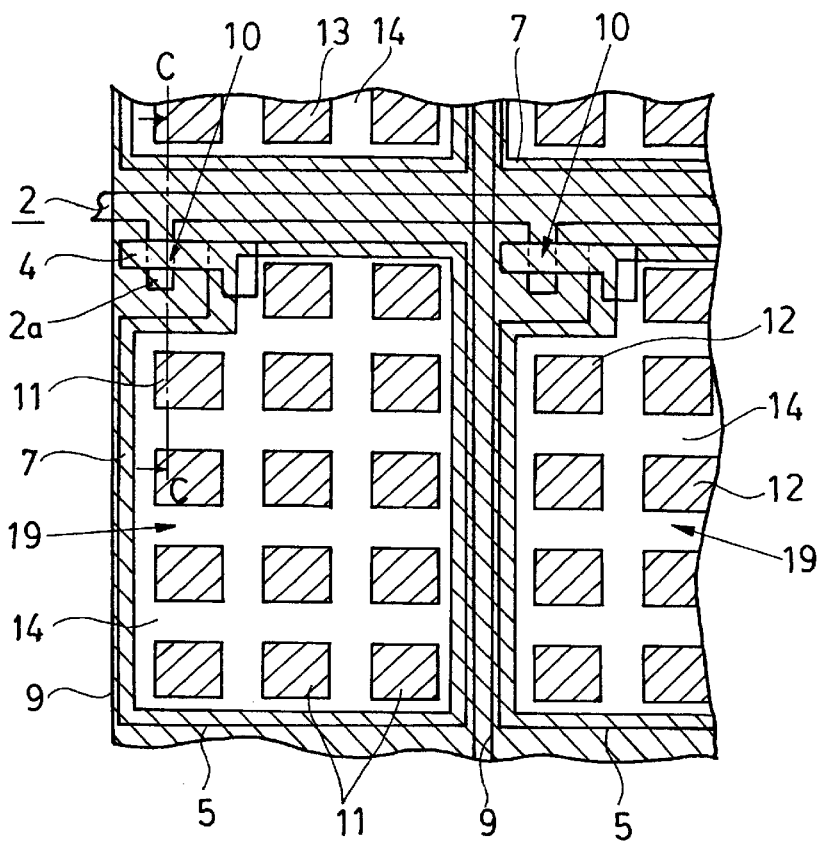
FIG. 3 is an enlarged partial plan view of a liquid crystal display panel that is a second embodiment of the invention and FIG. 4 is an enlarged sectional view taken along line C—C in FIG. 3.
Figure 4:
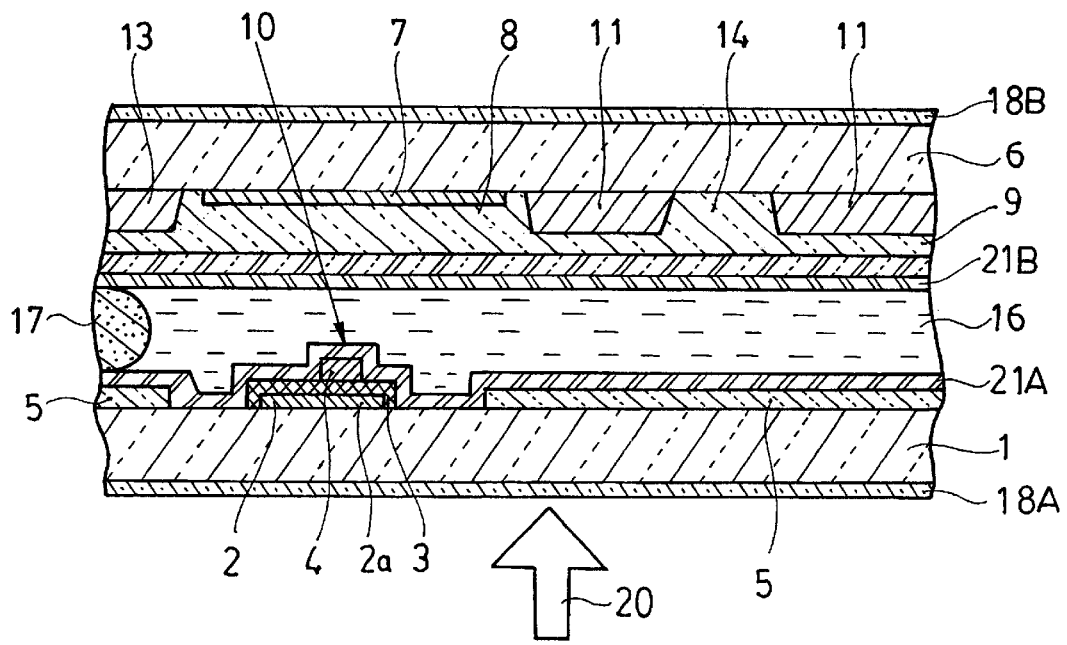

Second Embodiment: FIGS. 3 and 4

The configuration of a liquid crystal display panel that is a second embodiment of the invention will be explained next with reference to FIGS. 3 and 4. This liquid crystal display panel is a transmissive color liquid crystal display panel.

In this liquid crystal display panel, too, signal electrodes 2 having first electrodes 2a and made of tantalum (Ta) film are provided on the first substrate 1 made of a transparent material. A non-linear resistance layer 3 made of tantalum oxide ($Ta_2O_5$), an anodic oxide film of the signal electrode 2, is provided on surface of each signal electrode 2 and its first electrodes 2a.

Second electrodes 4 made of chromium (Cr) film are provided to overlap the non-linear resistance layer 3 of each first electrode 2a. thereby constituting non-linear resistance elements 10.

A large number of display electrodes 5 constituted of indium-tin-oxide (ITO), which is transparent and conductive, are formed on the first substrate 1 in a closely spaced matrix arrangement. Portions of the second electrodes 4 make contact with the display electrodes 5.

As shown in FIG. 3, the first electrodes 2a and the display electrodes 5 are separated by a prescribed distance. Each display electrode 5 is disposed in alignment with a counter electrode 9 across an intervening liquid crystal layer 16 (explained later) to constitute a pixel region 19 of the liquid crystal display panel.

To prevent leakage of light from the gaps between the display electrodes 5 formed on the first substrate 1, a two-layer black matrix 7 composed of a chromium oxide (CrO) film and a chromium (Cr) film is formed on the second substrate 6, which is made of a transparent material, to cover the portions surrounding the display electrodes 5.

The second substrate 6 is provided at regions thereof lying opposite the display electrodes 5 with color filters 11, 12 and 13 that are divided into multiple segments (14 segments in this example). These filters 11, 12 and 13 are of three colors: blue (B), red (R) and green (G).

Although the color filter segments are shown to be spaced apart and aligned vertically and laterally in FIG. 3, they can, as in the first embodiment explained earlier, instead be staggered laterally or vertically or in both directions. In each pixel region 19, the area occupied by the color filter (the total area of the color filter segments) is smaller than the area of a single pixel region 19. The regions around the segments of the color filters 11, 12 and 13 exhibit no filtering action and constitute light transmitting portions 14 that pass light with substantially no attenuation.

The counter electrodes 9 are further provided on the second substrate 6 as strips of indium-tin-oxide (ITO) film, which is transparent and conductive, running perpendicular to the signal electrodes 2 so as each to oppose one column of the display electrodes 5. Data electrodes (not shown) are connected to the counter electrodes 9 for applying signals from an external circuit.

Transparent insulated protection layers 8 are provided between the counter electrodes 9 and the multiple color filters 11, 12 and 13 and at the light transmitting portions 14.

The opposed inner surfaces of the first substrate 1 and the second substrate 6 are provided with alignment films 21A, 21B as processed layers for regularly aligning the molecules of the liquid crystal of the filled liquid crystal layer 16.

A prescribed spacing is maintained between the opposed first substrate 1 and second substrate 6 by means of spacers 17. The liquid crystal layer 16 is filled in the gap between the first substrate 1 and the second substrate 6.

A polarization film 18A is disposed on the outer (lower) surface of the first substrate 1 and a polarization film 18B is disposed on the outer (upper) surface of the second substrate 6. Since this liquid crystal display panel is not self-illuminating, it is provided on the outer (lower) side of the first substrate 1 with an auxiliary light source that emits auxiliary light 20 to enable color display by modifying an optical characteristic of the liquid crystal layer 16.

Specifically, an optical characteristic of the liquid crystal layer 16 of the pixel regions 19 between the display electrodes 5 and the counter electrodes 9 (including, for example, rotation of the major axes of the liquid crystal molecules) is modified via the non-linear resistance elements 10 by selectively applying driving voltages produced by an external circuit across the signal electrodes 2 and the counter electrodes 9 via the data electrodes. thereby effecting display of a desired image by controlling the exiting of the incident auxiliary light 20 from the second substrate 6.

At this time, the light exiting the liquid crystal display panel can pass not only through different ones of the color filters 11, 12 and 13 at the pixel regions 19 but also through the light transmitting portions 14, which cause substantially no light attenuation. A bright color display is therefore possible.

In addition, since the light transmitting portions between the island-like color filter segments are provided within the pixel regions 19 and the liquid crystal layer 16 at these portions can be applied with voltage to modify an optical characteristic thereof in the same manner as at the portions where the color filters are present, the provision of the light transmitting portions 14 causes substantially no reduction of the contrast ratio.

Thus, the transmissive color liquid crystal display panel according to the second embodiment of the invention enables bright color display by auxiliary light.

Figure 5:
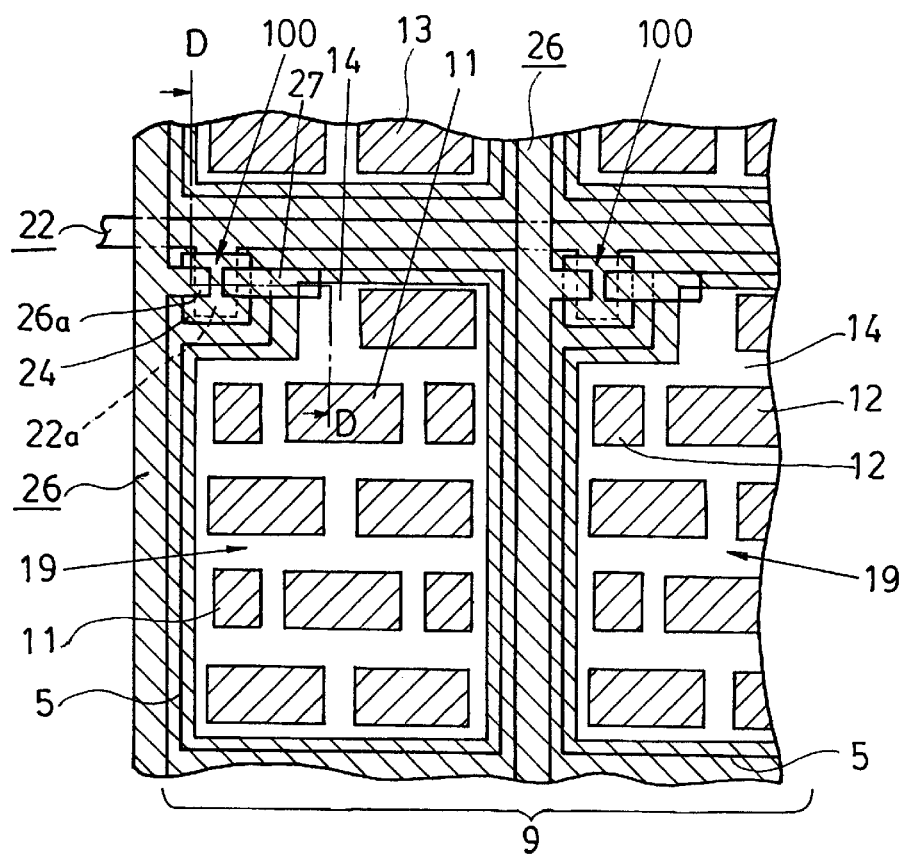
FIG. 5 is an enlarged partial plan view of a liquid crystal display panel that is a third embodiment of the invention and FIG. 6 is an enlarged sectional view taken along line D—D in FIG. 5.
Figure 6:
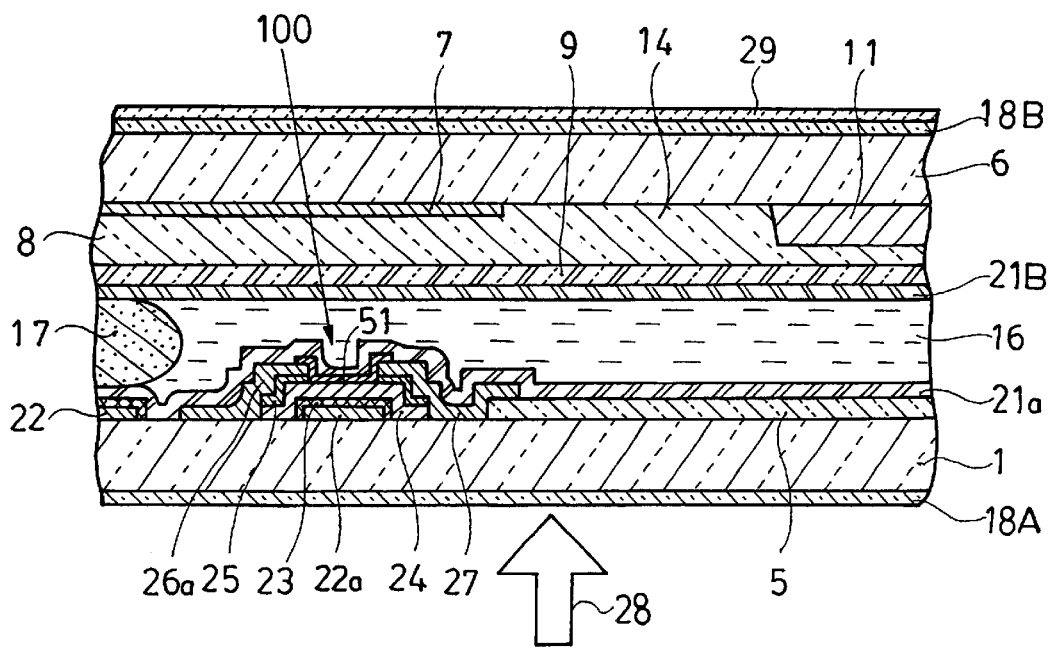

Third Embodiment: FIGS. 5 and 6

The structure of a liquid crystal display panel that is a third embodiment of the invention will be explained next with reference to FIGS. 5 and 6. This liquid crystal display panel is a reflective color liquid crystal display panel using thin film transistors (TFTs) as switching elements.

The first substrate 1 made of transparent material shown in FIG. 6 is provided thereon with gate electrodes 22 made of tantalum (Ta) film. Each gate electrode 22 has projecting portions 22a at locations where thin film transistors are formed with respect to pixel regions 19. The gate electrode 22 including its projecting portions 22a is formed thereon with a gate insulating film 23 made of tantalum oxide ($Ta_2O_5$), an anodic oxide film of the gate electrode 22.

A semiconductor layer 24 made of amorphous silicon (a-Si) is formed on and around the gate insulating film 23 on each projecting portion 22a of the gate electrode 22.

N-type amorphous silicon (N-type a-Si) 25, doped amorphous silicon, is provided on each semiconductor layer 24 to partially overlap the projecting portion 22a of the gate electrode 22.

The N-type amorphous silicon 25 is provided thereon with a projecting portion 26a of a source electrode 26 made of molybdenum (Mo) and a drain electrode 27. A protected insulation film (passivation film) 51 for preventing degradation of the characteristics of the semiconductor layer 24 is provided on the semiconductor layer 24 between the projecting portion 26a of the source electrode 26 and the drain electrode 27.

These elements constitute a thin film transistor (TFT) 100 serving as a switching element.

Display electrodes 5 constituted of indium-tin-oxide (ITO), which is transparent and conductive, are provided on the first substrate 1 in a matrix arrangement. The source electrodes 26 of the TFTs 100 are connected to data electrodes (not shown) for application of an external signal and the drain electrodes 27 are connected to the display electrodes 5.

To prevent leakage of light from the gaps between the display electrodes 5 formed on the first substrate 1 and to prevent incident light from reaching the semiconductor layers 24 of the TFTs 100, a black matrix 7 composed of a chromium (Cr) film is provided on the second substrate 6, which is made of a transparent material.

The second substrate 6 is provided at regions thereof lying opposite the display electrodes 5 with color filters 11, 12 and 13. The color filters 11, 12 and 13 are of three colors: blue, red and green.

In each region lying opposite a display electrode 5, the color filter 11, 12 or 13 is divided into multiple island-like color filter segments (11 segments in this example) of two sizes (large and small) disposed in spaced arrangement. Light transmitting portions 14 with no filtering action are provided between the multiple color filter segments and between the multiple color filter segments and the black matrix 7.

At each pixel region 19 constituted by a display electrode 5 and an opposed counter electrode 9 (explained later), the light transmitting portion 14 is formed in a winding pattern. Although it winds only in the X-axis direction in this embodiment, it can instead wind in only the Y-axis direction or in both the X-axis direction and the Y-axis direction. Since the formation of the light transmitting portions 14 in such a winding pattern prevents continuity of regions with high light transmittance, it enhances the color mixing property between the color filters 11, 12 and 13 and the light transmitting portions 14.

Although for ease of explanation a case in which the color filter provided at each pixel region 19 is divided into 11 segments is exemplified in this embodiment, the color mixing property between the color filter 11, for example, and the light transmitting portion 14 can be improved by still finer subdivision.

The second substrate 6 is provided thereon with a counter electrode 9 consisting of a transparent and conductive indium-tin-oxide (ITO) film extending over its entire surface to face all of the display electrodes 5.

The display electrodes 5 are disposed to face the counter electrode 9 across the intervening liquid crystal layer 16, thereby forming the pixel regions 19 of the liquid crystal display panel.

The opposed inner surfaces of the first substrate 1 and the second substrate 6 are provided with alignment films 21A, 21B as processed layers for regularly aligning the molecules of the liquid crystal layer 16.

A prescribed spacing is maintained between the opposed first substrate 1 and second substrate 6 by means of spacers 17. The liquid crystal layer 16 is filled in the gap between the first substrate 1 and the second substrate 6.

A polarization film 18A is disposed on the outer (lower) surface of the first substrate 1 and a polarization film 18B and a reflecting film 29 are provided on the outer (upper) surface of the second substrate 6. Since this liquid crystal display panel is not self-illuminating, the outer (lower) side of the first substrate 1 is directed to face the observer, natural, artificial or other external light 28 is allowed to enter from the side of the first substrate 1, and color display is effected by modifying an optical characteristic of the liquid crystal layer 16.

Specifically, an optical characteristic of the liquid crystal layer 16 of the pixel regions 19 (including, for example, rotation of the major axes of the liquid crystal molecules) is modified by applying driving voltages produced by an external circuit to the gate electrodes 22 and the source electrodes 26 connected to the data electrodes to selectively apply voltages across the display electrodes 5 and the counter electrode 9 via the TFTs 100, thereby effecting desired color image display by controlling the exiting of the external light 28 entering the liquid crystal display panel back through the first substrate 1 owing to reflection from the reflecting film 29.

At this time, the light exiting the liquid crystal display panel can pass not only through different ones of the color filters 11, 12 and 13 at the pixel regions 19 but also through the light transmitting portions 14, which cause substantially no light attenuation, provided thereabout. A bright color display is therefore possible.

In addition, since the light transmitting portions between the island-like color filter segments are provided within the pixel regions 19 and the liquid crystal layer 16 at these portions can be applied with voltage to modify an optical characteristic thereof in the same manner as at the portions where the color filters are present, the provision of the light transmitting portions 14 causes substantially no reduction of the contrast ratio.

Since the liquid crystal layer 16 and the reflecting film 29 are provided to sandwich the second substrate 6 and a gap is established, the external light 28 entering from an oblique direction, passing through the light transmitting portion 14 and reflected by the reflecting film 29 is positionally offset to pass through a nearby color filter 11, 12 or 13 and exit in the direction of the external light 28. Color display purity is therefore enhanced.

Owing to the arraying to the segments of the color filter 11 etc. at the pixel regions 19 so as to form the light transmitting portions 14 in a winding pattern, moreover, the color mixing property between the color filter 11 etc. and the light transmitting portions 14 is improved to enable an excellent display.

Thanks to the formation of the light transmitting portions 14 around the color filter segments, this embodiment enables provision of a liquid crystal display panel with high display luminance. Further, by using the reflecting film 29 and the light transmitting portions 14 provided around the color filter segments to reflect a portion of the color of the color filters in the vicinity of the light transmitting portions 14, the embodiment enables a bright, high-color-purity color display.

Figure 7:
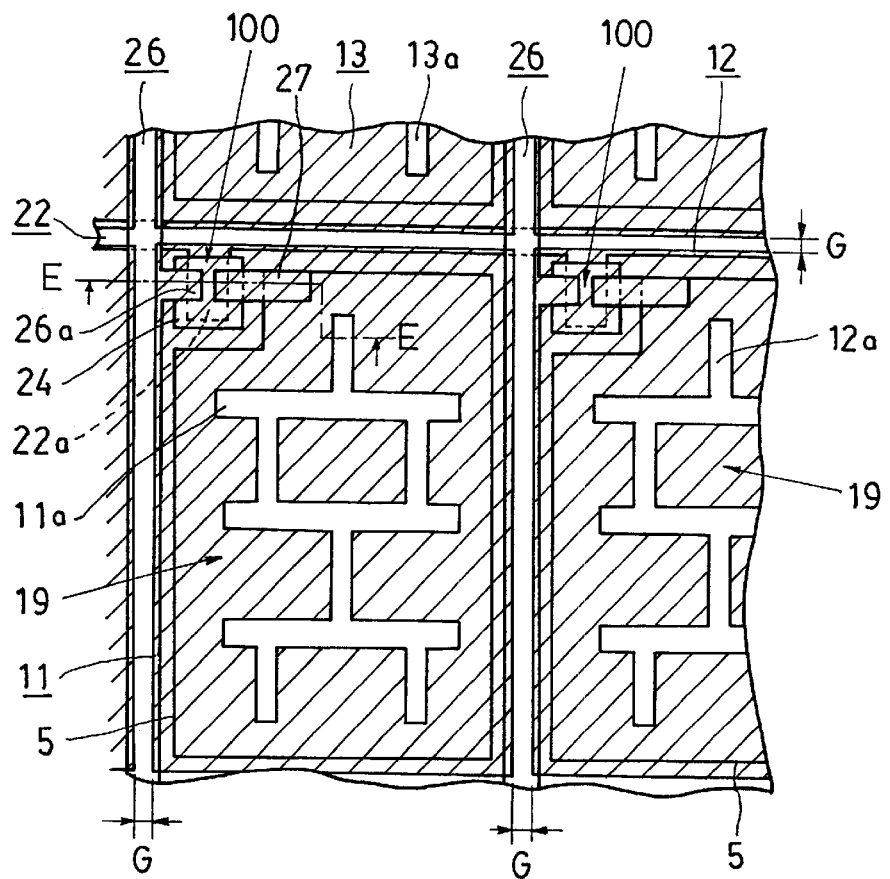
FIG. 7 is an enlarged partial plan view of a liquid crystal display panel that is a fourth embodiment of the invention and FIG. 8 is an enlarged sectional view taken along line E—E in FIG. 7.
Figure 8:
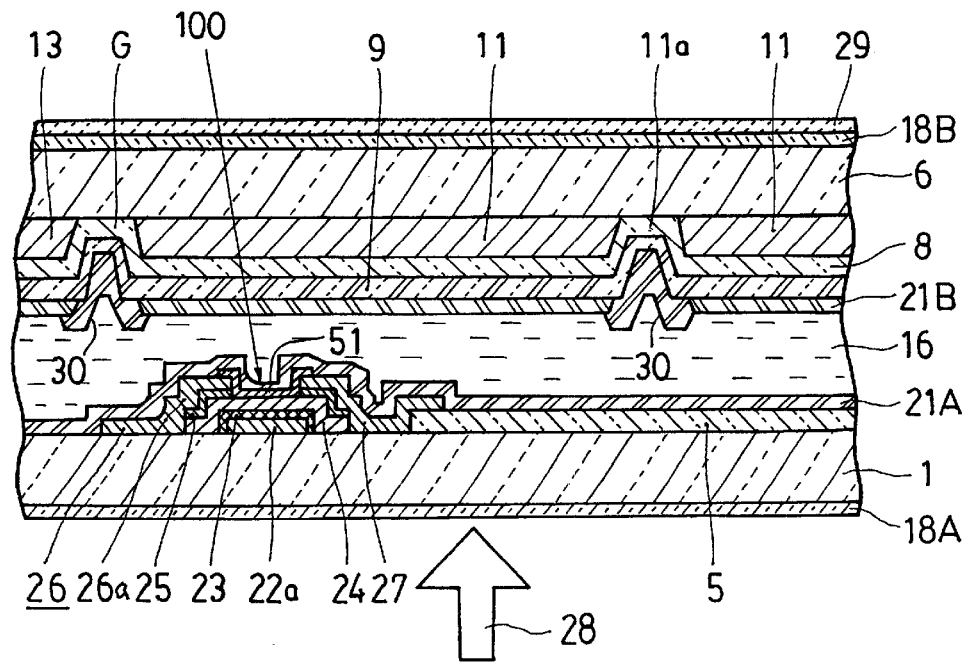

Fourth Embodiment: FIGS. 7 and 8

A liquid crystal display panel that is a fourth embodiment of the invention will be explained next with reference to FIGS. 7 and 8. Like the third embodiment described in the foregoing, this liquid crystal display panel is also a reflective color liquid crystal display panel using thin film transistors (TFTs) as switching elements.

As the material and structure of the thin film transistors (TFTs) 100 and the display electrodes 5 formed with respect to the pixel regions 19 on the first substrate 1 of this liquid crystal display panel are the same as those in the third embodiment, explanation thereof will be omitted.

The second substrate 6, which is made of a transparent material, has no black matrix thereon but is provided at each region opposite a display electrode 5 with a color filter 11, 12 or 13 covering the entire region. The color filters 11, 12 and 13 in this embodiment are of three colors: cyan, magenta and yellow.

Within their regions lying opposite the display electrodes 5, the color filters 11, 12 and 13 have openings 11a, 12a and 13a as portions whose light transmittance is higher than other portions thereof.

Since no black matrix is provided on the second substrate 6 in this embodiment, the openings 11a, 12a and 13a of the color filters are not provided at the peripheral portions of the display electrodes 5 and have the shape of closed loops.

Further, the color filters 11, 12 and 13 are provided to cover the upper surfaces of the TFTs 100. Since this structure causes the color filters 11, 12 or 13 to be present at the peripheral region of each pixel region 19, it enables limitation of the light transmittance. Mixing of information not to be displayed into the information to be displayed by the pixel region 19 can therefore be prevented.

The second substrate 6 is further provided thereon with a counter electrode 9 consisting of a transparent and conductive indium-tin-oxide (ITO) film extending over its entire surface to face all of the display electrodes 5. A transparent and insulated protection layer 8 is provided between the counter electrode 9 and the color filters 11, 12 and 13.

The display electrodes 5 are disposed to face the counter electrode 9 across the intervening liquid crystal layer 16, thereby forming the pixel regions 19 of the liquid crystal display panel.

The opposed inner surfaces of the first substrate 1 and the second substrate 6 are provided with alignment films 21A, 21B as processed layers for regularly aligning the molecules of the liquid crystal layer 16.

Alignment films 30 discrete from the alignment films 21B on the color filter are formed at the openings 11a, 12a and 13a formed in the color filters 11, 12 and 13 and on the counter electrodes 9 at the gaps G between the color filters.

In this fourth embodiment, the alignment films 21B provided on the color filters 11, 12 and 13 are processed to align the major axes of the liquid crystal molecules to 4:30 o'clock, while the direction of liquid crystal major axis alignment at the alignment film 21A is 7:30 o'clock. In other words, the liquid crystal layer 16 is twisted by an angle of 90°.

In contrast, the alignment films 30 provided at the openings 11a, 12a and 13a and the gaps G between the color filters are processed to align the major axes of the liquid crystal molecules to 7:30 o'clock.

The alignment processing is thus effected in different directions between the alignment film 21B and the alignment film 30 so as to align the liquid crystal major molecular axes in different directions, thereby enabling a good display (particularly of half tones) over a wide field of view even when the positional relationship between the observer and the liquid crystal display panel varies.

In other words, when the liquid crystal molecules aligned at the alignment film 21B effect display excessively on the black side, the degree of the excessive black display is mitigated since the liquid crystal molecules aligned at the alignment films 30 do not effect excessive black display.

Moreover, even when a pixel region 19 is in the maximum luminance display state, the amount of light is reduced at the portion of the color filter 11, 12 or 13. When the portion of the opening 11a, 12a or 13a is also at maximum luminance, therefore, the difference in luminance tends to become conspicuous because the amount of light is not reduced at this portion. However, since the portion of the openings 11a, 12a or 13a is darkened owing to differentiation of the alignment direction between the alignment film 21B and the alignment film 30 in the aforesaid manner, the effect is to make the difference in luminance less conspicuous.

Other aspects of the configuration are the same as those of the third embodiment described earlier.

In the liquid crystal display panel according to this fourth embodiment, the color filters 11, 12 and 13 of the pixel regions 19 are configured to have the black matrix-free openings 11a, 12a and 13a that pass light.

The light passage at the openings 11a, 12a and 13a is therefore greater than at the color filters 11, 12 and 13.

Moreover, in order to minimize the light transmittance at regions where voltage cannot be applied to the liquid crystal layer, no openings are provided in the color filters 11, 12 and 13 at locations corresponding to the peripheral regions of the display electrodes 5. Further, since the openings 11a, 12a and 13a of the color filters 11, 12 and 13 are provided within the pixel regions 19, the liquid crystal layer 16 at these portions can also be applied with voltage to modify an optical characteristic thereof in the same manner as at the portions where the color filters are present.

In addition, a good display over a wide field of view can be attained owing to the different direction of alignment processing of the alignment layers 30 at the regions of the alignment films 21B and the openings 11a etc. on the color filters.

Fifth Embodiment: FIGS. 9 to 13

Next, different color filter configurations of a liquid crystal display panel that is a fifth embodiment of the invention will be explained next with reference to FIGS. 9 to 13.

Although this liquid crystal display panel is configured similarly to the liquid crystal display panel of the fourth embodiment described above, it differs in the configuration of the color filter. Moreover, it has no need for alignment films or polarization films since it uses a mixture of polymer and liquid crystal for the liquid crystal layer. The same also applies to the embodiments that follow.

Figure 9:
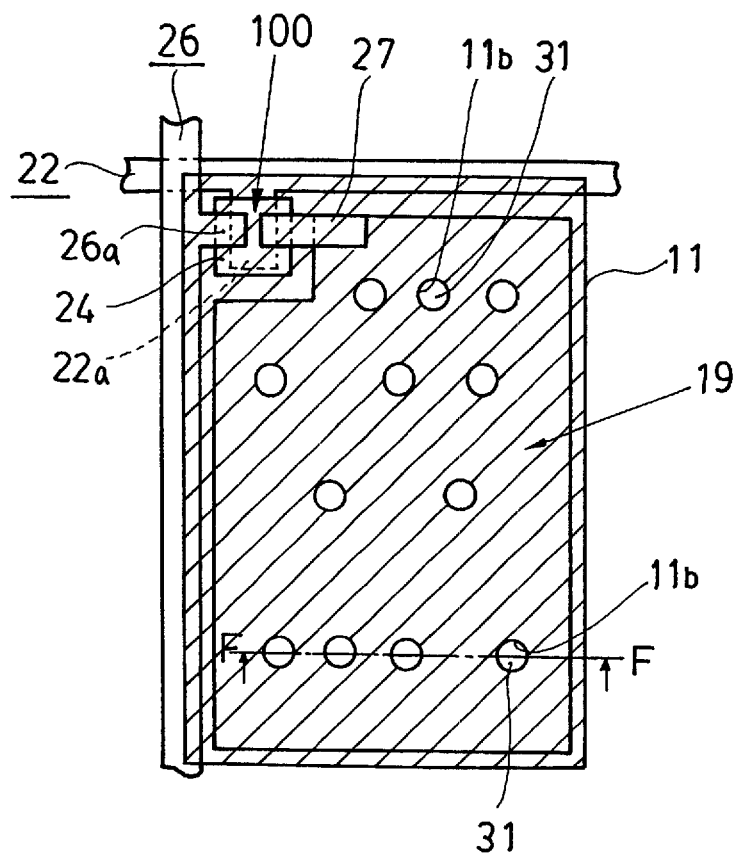
FIG. 9 is an enlarged partial plan view of a liquid crystal display panel that is a fifth embodiment of the invention and FIGS. 10 to 13 are enlarged and inverted sectional views taken along line F—F in FIG. 9 each showing only the second substrate side according to a different modification.
Figure 10:
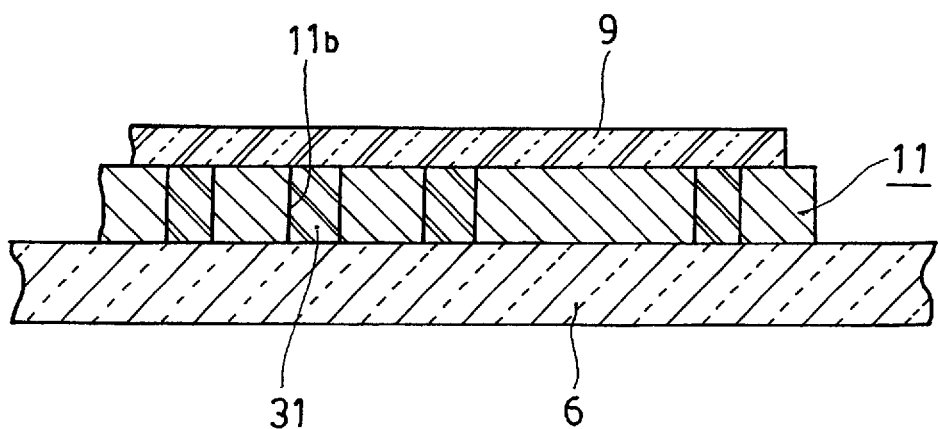

As shown in FIGS. 9 and 10, a color filter 11 is provided on the second substrate 6 at a region opposite a display electrode on a first substrate (neither shown). This liquid crystal display panel uses a combination of red, green, and blue filers or a combination of cyan, magenta and yellow filters. For convenience of explanation, the description here is made with respect to a representative one of these filters called the "color filter 11". The same also applies to the color filters of the embodiments that follow.

The color filter 11 is formed with multiple openings 11b. High-transmittance color filters 31 of the same color having higher light transmittance than the color filter 11 are embedded in the openings 11b. The high-transmittance color filters 31 produce an effect like that of the openings 11a of the color filter of the fourth embodiment.

The high-transmittance color filters 31 can be formed by a method utilizing photo-decolorization reaction of an organic pigment or partial dyeing. As shown in FIG. 10, a transparent counter electrode 9 is provided on the upper surfaces of the color filter 11 and the high-transmittance color filters 31.

Since, as shown by the sectional view of FIG. 10, the color filter formed to have high light transmittance portions in this manner is excellent in flatness, formation of the counter electrode 9 with bending no longer occurs, eliminating the risk of breakage.

Moreover, by making the area occupied per high-transmittance color filter 31 provided within the color filter 11 very small and providing a large number of the high-transmittance color filters 31, a liquid crystal display panel can be obtained that is both uniform and bright.

Figure 11:
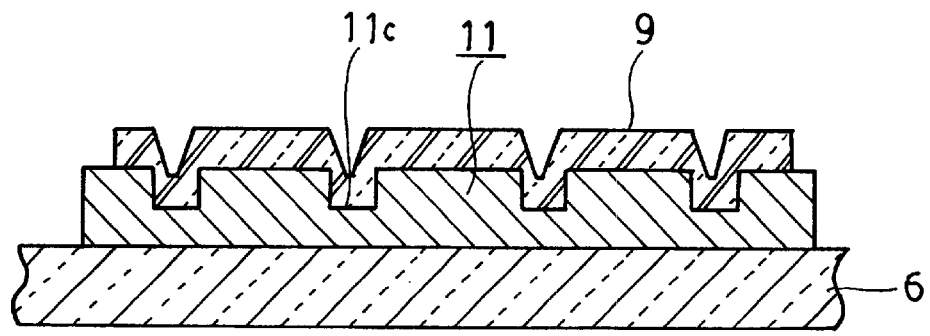

FIG. 11 is a sectional view similar to FIG. 10 showing an example of the color filter differing from that of FIG. 10.

The color filter 11 shown in FIG. 11 is provided with multiple thin portions 11c that have smaller thickness and higher light transmittance than the other portions. The thin portions 11c can be formed by partial etching of the color filter 11 or by partial multilayer color filter forming means.

A transparent counter electrode 9 is provided over the whole surface of the color filter 11 including the thin portions 11c.

By use of the color filter 11 configured in this manner, there can, in accordance with the ratio between the thicknesses of the thick portions and the thin portions 11c of the color filter 11, easily be obtained a liquid crystal display panel of a luminance suitable for its use environment.

Figure 12:
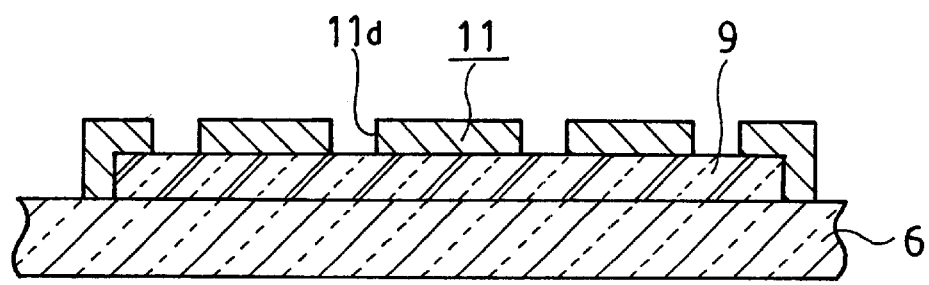

FIG. 12 is a sectional view similar to FIG. 10 showing another example of the color filter.

In the example shown in FIG. 12, a counter electrode 9 is provided on the second substrate 6 at a region opposite a display electrode on a first substrate (neither shown) and a color filter 11 is provided on the counter electrode 9. The color filter 11 has a large number of openings 11d.

With this configuration, even in the case of using a porous color filter 11 having the large number of openings 11d or a thick color filter 11, breakage of the counter electrode 9 is less likely to occur owing to the provision of the counter electrode 9 on a layer under the color filter 11. Further, it is possible to prevent discoloration and/or lowering of the transmittance of the color filter 11 by the counter electrode 9 forming step.

Figure 13:
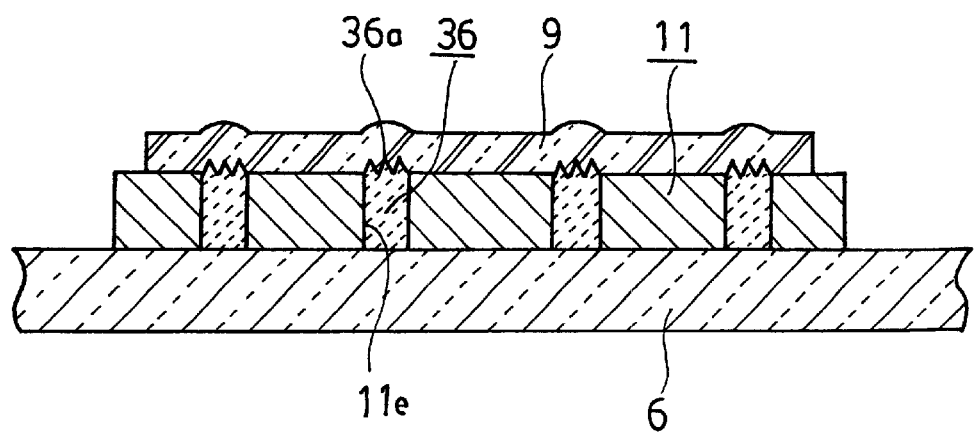

FIG. 13 is a sectional view similar to FIG. 10 showing another example of the color filter.

In the example shown in FIG. 13, a color filter 11 is provided on the second substrate 6 at a region opposite a display electrode on a first substrate (neither shown). The color filter 11 is formed with a large number of openings 11e. Resin 36 having light transmittance is embedded in the openings 11e and the exposed surfaces thereof are roughened to form uneven surfaces 36a. The uneven surfaces 36a scatter light. Moreover, the portions at the uneven surfaces 36a have high light transmittance.

The uneven surfaces 36a can be formed by spin-coating a photosensitive resin on the second substrate 6, hardening the photosensitive resin by heat drying, blowing fine particles onto the surface of the photosensitive resin to roughen it, and forming the photosensitive resin to a prescribed shape by photolithography.

A counter electrode 9 is further provided on the color filter 11 and the uneven surfaces 36a.

With this configuration, light from the uneven surfaces 36a spreads through the surrounding color filter 11 to increase the amount of pixel region light and enable a display that is bright and high in uniformity.

Figure 14:
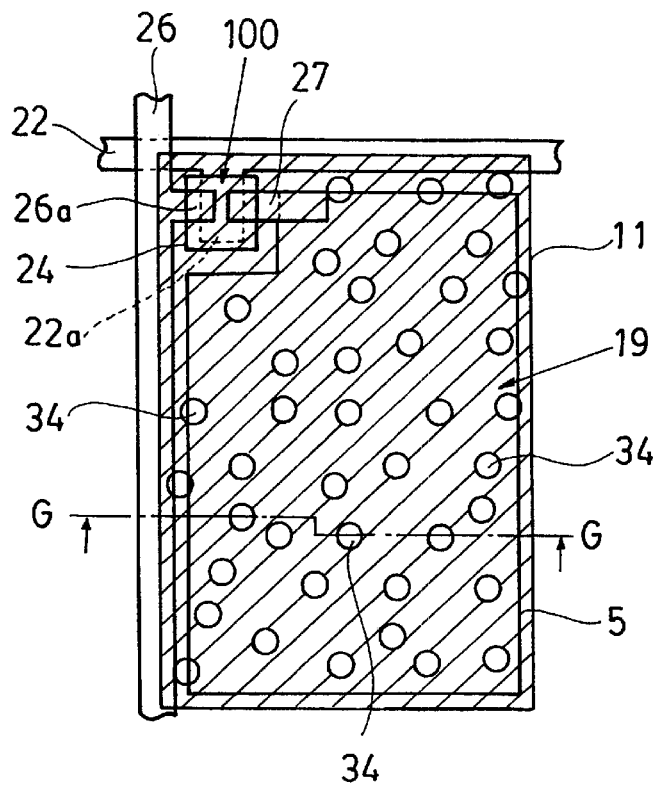
FIG. 14 is an enlarged partial plan view of a liquid crystal display panel that is a sixth embodiment of the invention.
Figure 15:
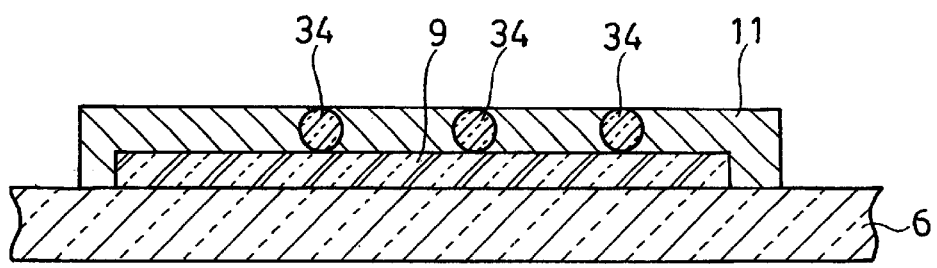
FIG. 15 is an enlarged and inverted sectional view taken along line G—G in FIG. 14 showing only the second substrate side.
Figure 16:
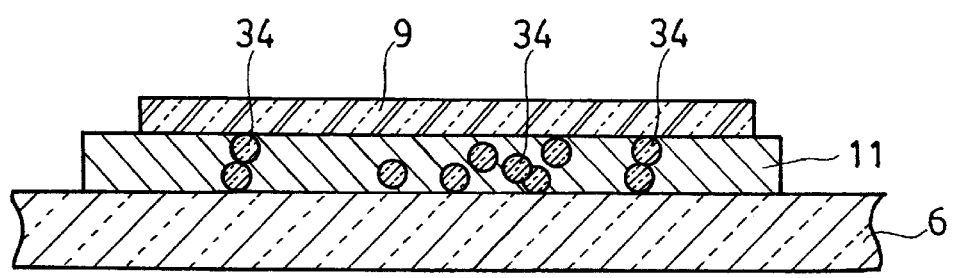
FIG. 16 is a sectional view similar to FIG. 15 showing a modification.

Sixth Embodiment: FIGS. 14 to 16

Next, different examples of the configuration of a color filter in a liquid crystal display panel that is a sixth embodiment of the invention will be explained with reference to FIGS. 14 to 16.

Although this liquid crystal display panel is also configured similarly to the liquid crystal display panel of the fourth embodiment described above, it differs in the configuration of the color filter.

As shown in the plan view of FIG. 14 and the sectional view of FIG. 15, a counter electrode constituted as a transparent conductive film is provided on the second substrate 6 at a region opposite a display electrode on a first substrate (neither shown) and a color filter 11 is provided on the counter electrode.

Multiple light transmitting insulation particles 34 that pass light and have insulating property are contained in the color filter 11. Owing to the light transmitting insulation particles 34, the color filter 11 is provided with high light transmittance portions. The light transmitting insulation particles 34 are made spherical, cylindrical or polyhedral.

With this configuration, since light entering the color filter 11 is diffused within the color filter 11 by the light transmitting insulation particles 34, the amount of pixel region light increases to enable a display that is bright and high in uniformity.

FIG. 16 is a sectional view similar to FIG. 15 showing an example in which the configuration of the color filter and the location of the counter electrode differs from those in FIG. 15.

In the example shown in FIG. 16, the color filter 11 is provided on the second substrate 6 at a region opposite a display electrode on the first substrate (neither shown). A large number of light transmitting insulation particles 34 that pass light and have insulating property are contained in the color filter 11.

Depending on the degree of dispersion of the light transmitting insulation particles 34, portions where a number of the light transmitting insulation particles 34 aggregate form in the color filter 11. These portions function in the same way as high light transmittance portions or openings.

The light transmitting insulation particles 34 are made spherical, cylindrical or polyhedral. The light transmitting insulation particles 34 can therefore diffuse light within the color filter 11.

The counter electrode 9 constituted as a transparent conductive film is provided on the upper surface of the color filter 11.

With this configuration, light entering the individual transmitting insulation particles 34 of the color filter 11 spreads through the surrounding color filter 11 to be further scattered by other light transmitting insulation particles 34 dispersed in the color filter 11, thereby increasing the amount light passing through the pixel region to enable a display that is bright and high in uniformity.

Seventh Embodiment: FIGS. 17 to 20

A liquid crystal display panel that is a seventh embodiment of the invention and the structure of a wristwatch using the liquid crystal display panel will now be explained with reference to FIGS. 17 to 20.

Figure 17:
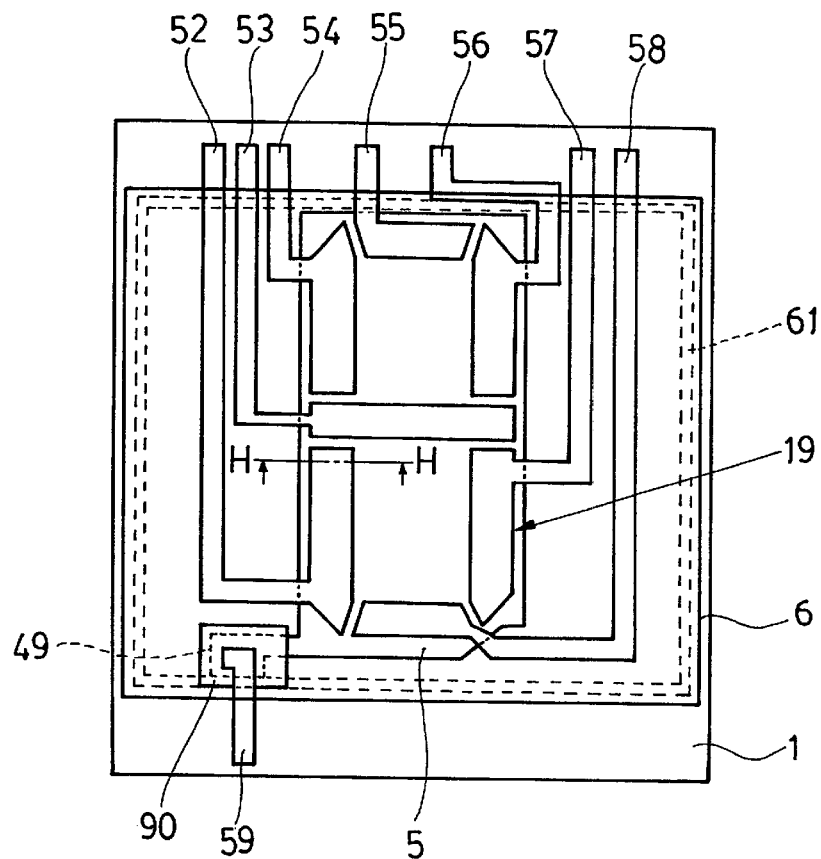
FIG. 17 is a plan view of a liquid crystal display panel that is a seventh embodiment of the invention and FIG. 18 is an enlarged sectional view taken along line H—H in FIG. 17.
Figure 18:
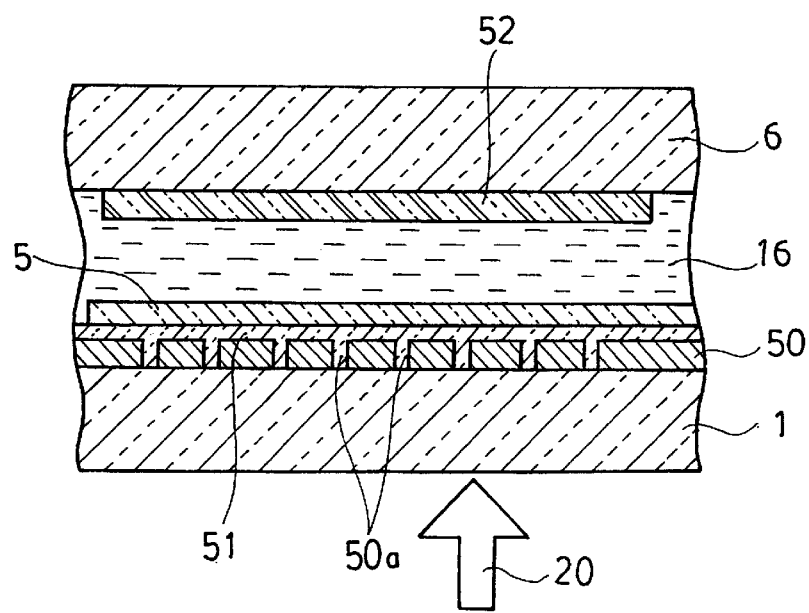

FIG. 17 is a plan view of the liquid crystal display panel according to the seventh embodiment of the invention and FIG. 18 is an enlarged sectional view taken along line H—H therein.

The liquid crystal display panel shown in FIGS. 17 and 18 has a first substrate 1 and a second substrate 6 made of a transparent material. The first substrate 1 is formed thereon with a reflecting film 50 constituted as a metallic film made of gold (Au) film. The reflecting film 50 is formed with multiple openings 50a.

As shown in FIG. 18, the reflecting film 50 on the first substrate 1 is formed thereon by a printing method with polyimide resin to constitute a protected insulation film 51. The protected insulation film 51 is inserted into the openings 50a of the reflecting film 50.

The protecting insulation film 51 on the first substrate 1 is provided thereon with a display electrode 5 constituted of indium-tin-oxide (ITO) film, which is transparent and conductive.

On the other hand, the second substrate 6, which faces the first substrate 1 across a prescribed gap, is formed thereon with a counter electrode 9 consisting of seven counter electrode segments 52, 53, 54, 55, 56, 57 and 58 constituted of indium-tin-oxide (ITO) film, which is transparent and conductive. The seven counter electrode segments 52–58 configure a seven-segment pattern capable of displaying numerals or the like.

The display electrode 5 on the first substrate 1 is provided on a region covering the whole area of the seven counter electrode segments 52–58 on the second substrate 6.

The second substrate 6 has thereon a signal electrode 49 that extends from the display electrode 5 on the first substrate 1 and a connection electrode 59 for transferring electrically to the second substrate 6. The connection electrode 59 and the signal electrode 49 are electrically connected by a conductor 90 made of conductive particles and an adhesive.

As shown in FIG. 18, the reflecting film 50 constituted of metallic film is formed at the region where the counter electrode segments 52–58 and the display electrode 5 lie opposite each other, thereby forming a pixel region 19.

After a liquid crystal layer 16 consisting of a mixture of a liquid crystal and a monomer has been injected between the first substrate 1 and the second substrate 6, the monomer is converted to a polymer of crosslinked structure by exposure with ultraviolet light from the side of the second substrate 6. The liquid crystal layer 16 is filled in the gap between the first substrate 1 and the second substrate 6 by a sealing material and a closed element (not shown).

As further shown in FIG. 18, an auxiliary light source is provided on the outer side of the first substrate 1 of the liquid crystal display panel and the auxiliary light 20 therefrom is directed onto the rear side to project the light into the liquid crystal display panel through the multiple openings 50a of the reflecting film 50, thereby effecting display.

An example configuration of a wristwatch utilizing this liquid crystal display panel will be explained with reference to the plan view of FIG. 19 and the sectional view of FIG. 20.

This wristwatch is of digital display type. It has a watch case 62, a glass 63 and a back cover 64.

The second substrate 6, liquid crystal layer 16 and first substrate 1 of a liquid crystal display panel 81 of the type shown in FIGS. 17 and 18 are disposed in this order from the side of the glass 63. Reference numeral 61 designates a sealing material. A circuit board 65 for driving the liquid crystal display panel and an electroluminescent (EL) light 82 provided thereon as an auxiliary light source are mounted on the underside of the first substrate 1.

The circuit board 65 is electrically connected with the liquid crystal display panel by zebra rubbers 67 made by repeatedly overlaying stripe-like conductive layers and non-conductive layers.

A battery 66 is mounted on one section of the circuit board 65 as a power source for the circuit board 65.

Figure 19:
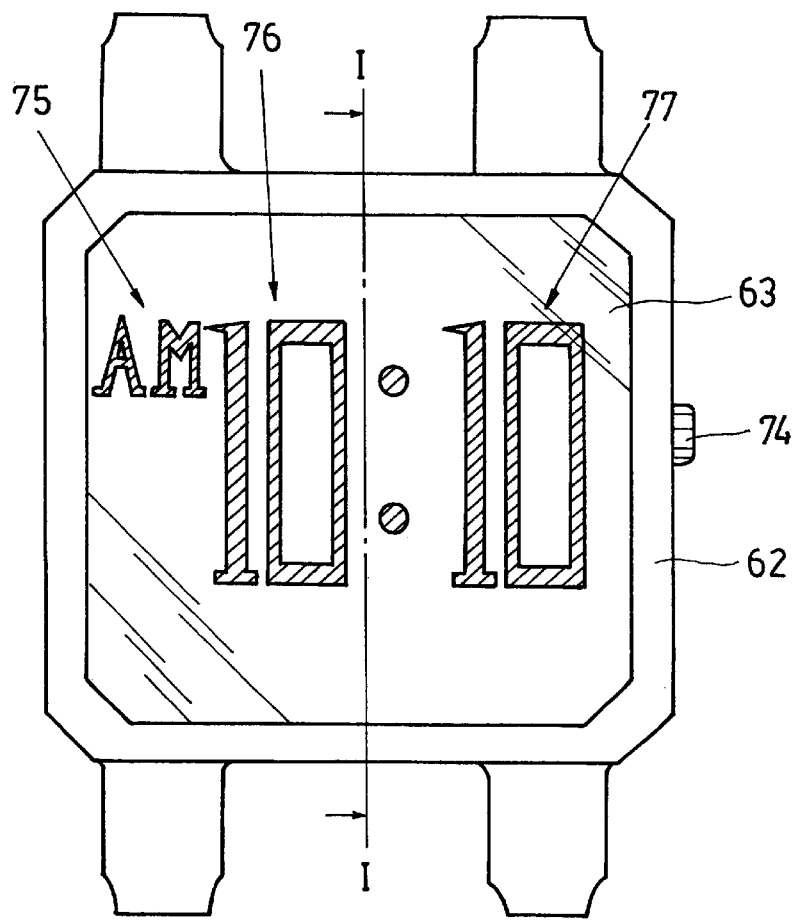
FIG. 19 is a schematic plan view of a digital display type wristwatch using a liquid crystal display panel like that of the seventh embodiment of the invention and FIG. 20 is a schematic sectional view taken along line I—I of FIG. 19.
Figure 20:
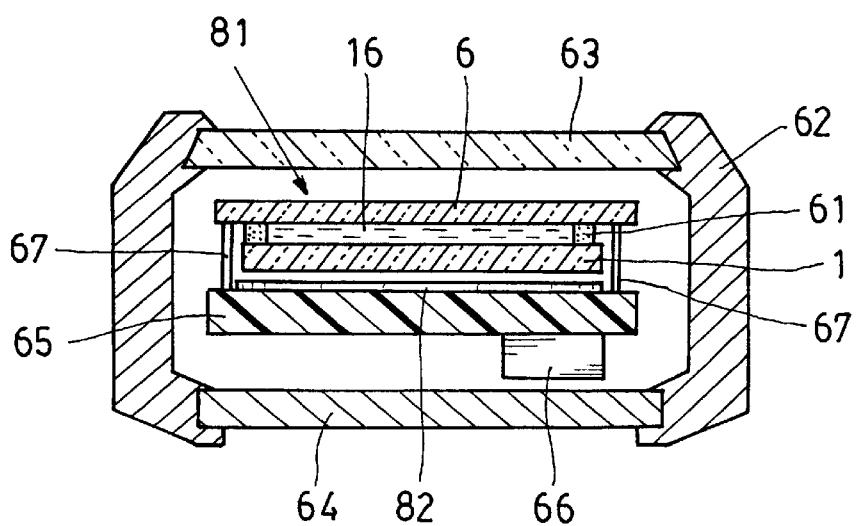

As shown in FIG. 19, the liquid crystal display panel 81 is formed with an AM/PM display section 75, an hour display section 76, a minute display section 77 etc. It also has a setting knob 74 for setting the time and the like.

When this wristwatch is illuminated by external light from the side of the glass 63, the external light proceeds to the metallic reflecting film 50 on the first substrate 1 via the route: glass 63→second substrate 6→liquid crystal layer 16. The light reflected by the reflecting film 50 exits through the glass 63 side along the same route in reverse.

In this case, voltage is selectively applied to the display electrode and the counter electrode segments of the display sections constituting the display sections 75, 76, 77 etc. in accordance with information from the circuit board 65 to modify an optical characteristic of the liquid crystal layer 16 and produce a display by the difference in the amount of light transmitted by the non-display regions and the pixel (display) regions, thereby providing the observer of the wristwatch with time and other information.

When the EL light 82, the internal auxiliary light source of the wristwatch, is turned on because the intensity of the external light is weak, the auxiliary light therefrom enters the liquid crystal display panel 81 through the multiple openings 50a of the reflecting film 50 on the first substrate 1, passes through the liquid crystal layer 16 and exits to the observer side to effect the required display.

Colors close to those when using external light can be obtained by adopting as the auxiliary light source an EL light 82 that emits yellow light.

When the intensity of the external light is strong, the wristwatch using the liquid crystal display panel of this embodiment provides golden reflected light from the reflecting film 50 made of gold film. Thus the important ornamental function of the wristwatch is enhanced by a display that gives a highly luxurious impression.

Further, owing to the use of a polymer dispersive liquid crystal consisting of a liquid crystal and a polymer as the liquid crystal layer 16, the scattering property during non-display and the high transmittance during display are thoroughly utilized. Therefore, it is possible to secure whitish-gold reflected light at non-display regions due to the scattering property of the liquid crystal layer 16 and to enable a golden display with a metallic luster at the display regions.

Moreover, when the external light is weak, display can be effected by using the auxiliary light source to introduce auxiliary light 20 into the liquid crystal display panel 81 through the multiple openings 50a of the reflecting film 50.

In this embodiment, which gives priority to display by reflected light, the number of openings 50a in the reflecting film 50 is made small and no openings 50a are provided in regions other than those where the display electrode 5 and the counter electrode (the counter electrode segments 52–58 etc.) lie opposite each other. Instead, however, the size of the openings 50a formed in the reflecting film 50 can be enlarged and/or the distribution density thereof can be increased in order to effect bright transmission-type display by the auxiliary light.

Eighth Embodiment: FIG. 21

FIGS. 21 to 24 are enlarged sectional views similar to that of FIG. 18 of liquid crystal display panels that are eighth to eleventh to embodiments of the invention.

The structure of a liquid crystal display panel that is an eighth embodiment of the invention will be explained first with reference to FIG. 21.

The first substrate 1 of this liquid crystal display panel is formed thereon with a reflecting film 50 constituted as a metallic film made of silver (Ag) thin film and having multiple openings 50a (hereinafter called the "first reflecting film"), a display electrode 5 constituted as a transparent conductive film, and a protected insulation film (passivation film) 51 made of polyimide resin for preventing electrical shorting of the reflecting film 50 and the display electrode 5 and degradation of the reflecting film (silver thin film) 50.

The second substrate 6, which faces the first substrate 1 across a prescribed gap, is provided thereon with a counter electrode 9 constituted in a prescribed shape of a transparent conductive film.

A liquid crystal layer 16 consisting of a mixture of a liquid crystal and a polymer obtained by imparting a crosslinked structure to a monomer by exposure with ultraviolet light is filled in the gap between the first substrate 1 and the second substrate 6.

These structural features are the same as those of the seventh embodiment of the liquid crystal display panel except for the reflecting film 50 being a silver film instead of a gold film.

In this eighth embodiment, the surface of the first substrate 1 on the opposite side from the surface provided with the reflecting film 50 (the lower surface in FIG. 21) is formed with a second reflecting film 80. The second reflecting film 80 is formed in a pattern corresponding to the multiple openings 50a formed in the reflecting film 50 at approximately corresponding locations.

An organic electroluminescent (EL) light 78 serving as an auxiliary light source and a lens film 79 are disposed as spaced from the second reflecting film 80. The lens film 79 has a characteristic whereby it directs light from the EL light 78 vertically with respect to the openings 50a of the reflecting film 50. A color filter can be provided on the lens film 79 to change the color of the auxiliary light emitted by the EL light 78 and used for display.

The second reflecting film 80 provided on the rear surface of the first substrate 1 is a semi-transparent film obtained by forming a metallic film to 3 to 30 nanometers (nm).

When external light enters from the side of the second substrate 6, the reflecting film 50 exhibits a bright reflection characteristic owing to its large reflectance. Further, part of the light reaching the second reflecting film 80 through the openings 50a is reflected by the second reflecting film 80 to reenter the liquid crystal layer 16.

It was learned from the results of an experiment regarding the relationship between the observer and the direction of external light incidence that, regarding incidence of external light, when the user reads the time with the wristwatch worn on the wrist, little light enters from the lower side (six o'clock side in the analog system). When the display region was small, therefore, the effect of external light reflection by the second reflecting film 80 was larger when the second reflecting film 80 was disposed at a position offset slightly toward the aforesaid lower side relative to the position directly opposite to the openings 50a of the first reflecting film 50.

In this embodiment, therefore, the second reflecting film 80 is disposed at a position offset slightly rightward relative to the position directly opposite the openings 50a of the reflecting film 50 as shown in FIG. 21.

Since the EL light 78 and the lens film 79 are used as the auxiliary light source, moreover, light can be projected toward the observer through the offset portions between the openings 50a of the reflecting film 50 and the second reflecting film 80. Therefore, as compared with the case of not providing the second reflecting film 80, better display quality can be achieved owing to the first reflecting film 50 and the second reflecting film 80 when the intensity of the external light is strong, while a bright display can be achieved even in the case of using the auxiliary light from the EL light 78.

Ninth Embodiment: FIG. 22

A liquid crystal display panel that is a ninth embodiment of the invention will be explained next with respect to FIG. 22.

The first substrate 1 of this liquid crystal display panel is formed thereon with a reflecting film 50 constituted of aluminum (Al) thin film and having multiple openings 50a, a display electrode 5 constituted as a transparent conductive film, and a protected insulation film (passivation film) 51 made of polyimide resin for preventing electrical shorting of the display electrode 5 and the reflecting film 50 and degradation of the reflecting film (aluminum thin film) 50. This configuration is the same as those of the seventh and eighth embodiments described above except for the material of the reflecting film 50.

On the other hand, the second substrate 6, which faces the first substrate 1 across a prescribed gap, is provided thereon in prescribed shapes with a counter electrode 9 constituted of a transparent conductive film and a color filter 11 for effecting color display. The color filter 11 here is blue, although it can be of any color.

An EL light 78 constituting an auxiliary light source and a scattering plate 91 are disposed at the rear surface side of the first substrate 1.

The density of the multiple openings 50a formed in the reflecting film 50 provided on the first substrate 1 is made lower in a region S1 corresponding to the pixel region where the display electrode 5 and the counter electrode 9 lie opposite each other than the density thereof at a region S2 corresponding to a peripheral non-display region.

The liquid crystal layer 16 is a mixed liquid crystal layer composed of a liquid crystal and a monomer that is exposed with ultraviolet light after being filled in the gap between the first substrate 1 and the second substrate 6 to convert the monomer to a polymer.

In the conventional liquid crystal display panel having no openings 50a in the reflecting film 50, exposure by ultraviolet light from the side of the first substrate 1 is blocked by the reflecting film 50, and when exposure with ultraviolet light is effected from the side of the second substrate 6, heavy attenuation by the color filter 11 occurs. The attenuation rate is particularly high in the case of a blue color filter 11.

In the liquid crystal display panel of this embodiment, however, the reflecting film 50 is formed with the multiple openings 50a and the openings 50a are provided in both the region S1 corresponding to the pixel region and the region S2 corresponding to the non-display region. The exposure of the liquid crystal layer 16 with ultraviolet light can therefore be efficiently conducted from the side of the first substrate 1 to effect thorough monomer to polymer crosslinking reaction of the liquid crystal layer 16.

Further, a mode is adopted in which the state of the liquid crystal and the polymer of the liquid crystal layer 16 becomes one of scattering when the voltage applied to the liquid crystal layer 16 is small and becomes one of transparency when the voltage is large. The non-display region therefore assumes a scattering state, since voltage is not applied to the liquid crystal layer 16 thereat, so that high brightness is observed under strong external light, to a lesser or greater degree depending on the angle of incidence, since the reflecting film 50 is a mirror surface.

When the external light is weak, the auxiliary light from the EL light 78 serving as the auxiliary light source is scattered by the scattering plate 91, whereby the auxiliary light enters from the rear side of the first substrate 1. The non-display region at the region S2 remains dark, however, because the scattering by the liquid crystal layer 16 impedes passage of the incident light to the side of the second substrate 6, while the pixel region at the region S1 produces a display in the color of the color filter 11 by the light passing through the liquid crystal layer 16 made transparent by the application of voltage.

Figure 23:
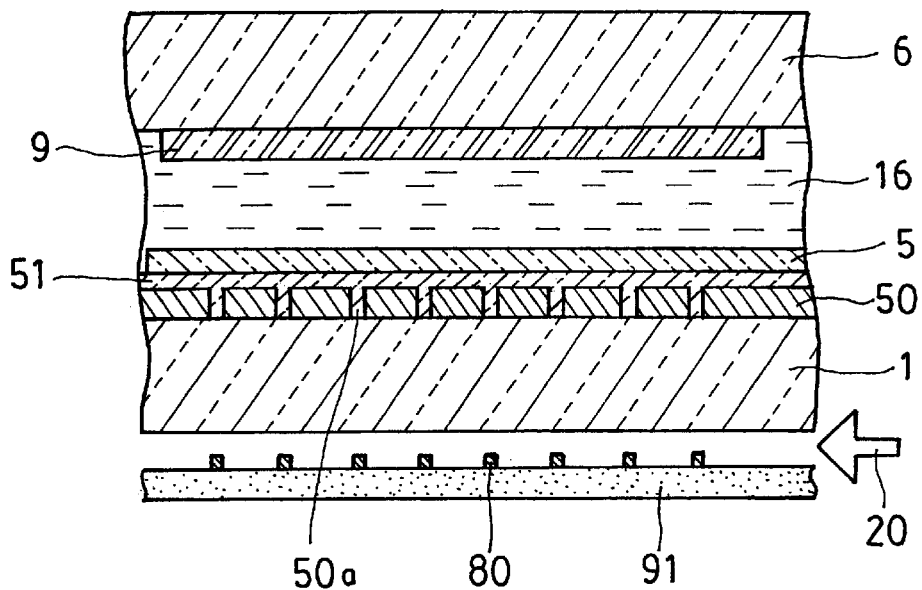

Tenth Embodiment: FIG. 23

A liquid crystal display panel that is a tenth embodiment of the invention will be explained next with respect to FIG. 23.

The internal configuration between the first substrate 1 and the second substrate 6 of this liquid crystal display panel is substantially the same as that of the eighth embodiment shown in FIG. 21, but the first reflecting film 50 provided on the first substrate 1 is constituted as a multilayer film composed of an aluminum (Al) thin film, an aluminum oxide ($Al_2O_5$) film and a transparent and conductive (indium-tin-oxide (ITO)) film. Owing to the optical interference effect produced by the different indices of refraction of the films of this multilayer film, golden reflected light can be obtained.

A scattering plate 91 is disposed across a prescribed gap from the side of the first substrate 1 opposite from the surface thereof provided with the first reflecting film 50 (the rear side) and a second reflecting film 80 is provided on the scattering plate 91. The second reflecting film 80 is formed in the same pattern as the multiple openings 50a formed in the first reflecting film at approximately coinciding locations.

A light emitting diode (LED) is provided at the periphery of the liquid crystal display panel as an auxiliary light source. The scattering plate 91 functions as a light-guide plate for illuminating the display with the auxiliary light 20 from the LED, and, moreover, the first substrate 1 and the scattering plate 91 are spaced across a prescribed gap so that the auxiliary light 20 from the LED can illuminate the whole liquid crystal display panel.

When the auxiliary light 20 enters this gap, its spreads within the gap while being randomly reflected by the scattering plate 91 and also proceeds while being reflected by the upper surface of the second reflecting film 80 and the lower surface of the first reflecting film 50, whereby it enters the liquid crystal layer 16 through the openings 50a of the first reflecting film 50.

The provision of the second reflecting film 80 made of metal on the scattering plate 91 in this way enhances the external light reflection property and enables efficient entry of auxiliary light from the periphery of the liquid crystal display panel into the liquid crystal display panel and exiting of this light in the direction of the second substrate 6.

Figure 24:
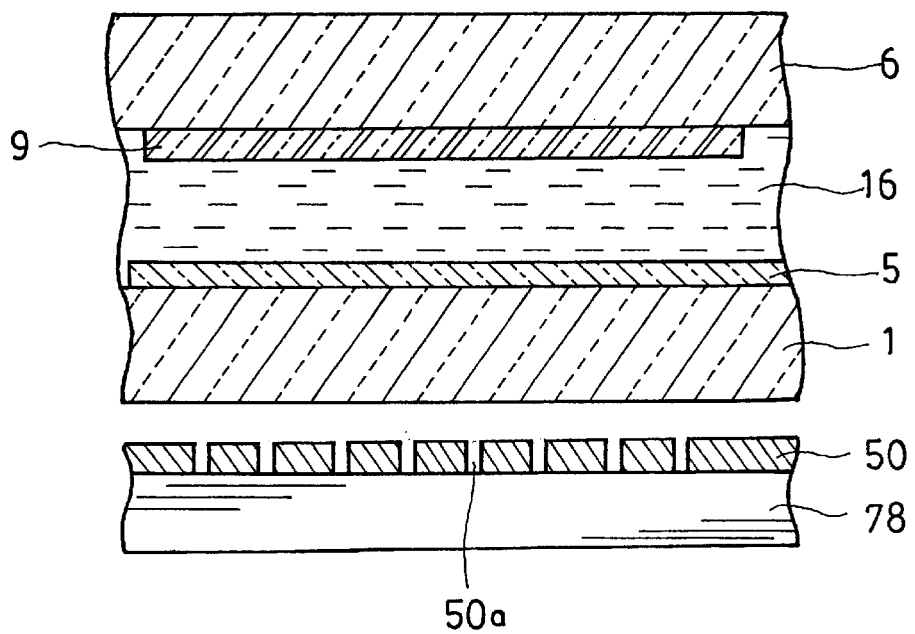

Eleventh Embodiment: FIG. 24

A liquid crystal display panel that is an eleventh embodiment of the invention will be explained next with respect to FIG. 24.

In this liquid crystal display panel, the first substrate 1 is provided thereon with only a display electrode 5 constituted of indium-tin-oxide (ITO) film, which is transparent and conductive. In other words, no reflecting film is provided on the first substrate 1 in this embodiment.

The second substrate 6, which faces the first substrate 1 across a prescribed gap, is provided thereon with a counter electrode 9 constituted in a prescribed shape of a transparent conductive film. A liquid crystal layer 16 including a polymer of crosslinked structure is filled in the gap between the first substrate 1 and the second substrate 6. No alignment film for aligning the liquid crystal is provided on the display electrode 5 or counter electrode 9.

In this eleventh embodiment, an EL light 78 serving as an auxiliary light source is disposed across a prescribed gap from the surface of the first substrate 1 opposite from the surface provided with the display electrode 5 (the rear side) and a reflecting film 50 of metallic film is provided on the surface thereof opposed to the first substrate 1.

The reflecting film 50 has multiple openings 50a and the auxiliary light emitted by the EL light 78 is directed toward the first substrate 1 through the openings 50a.

In this case, the positional relationship between openings 50a and the EL light 78 serving as the auxiliary light source differs from the positional relationship between the openings 50a and the pixel region where the display electrode 5 and the counter electrode 9 lie opposite each other. Since the openings 50a are located apart from the openings 50a, the openings 50a have relatively little effect on the display. Moreover, the observer can sufficiently discern the display by the auxiliary light from the EL light 78.

Twelfth Embodiment: FIGS. 25 to 28

A liquid crystal display panel that is a twelfth embodiment of the invention and a wristwatch using the liquid crystal display panel will now be explained with reference to FIGS. 25 to 28.

The structure of the liquid crystal display panel of the twelfth embodiment will be explained first with reference to FIGS. 25 and 26.

Figure 25:
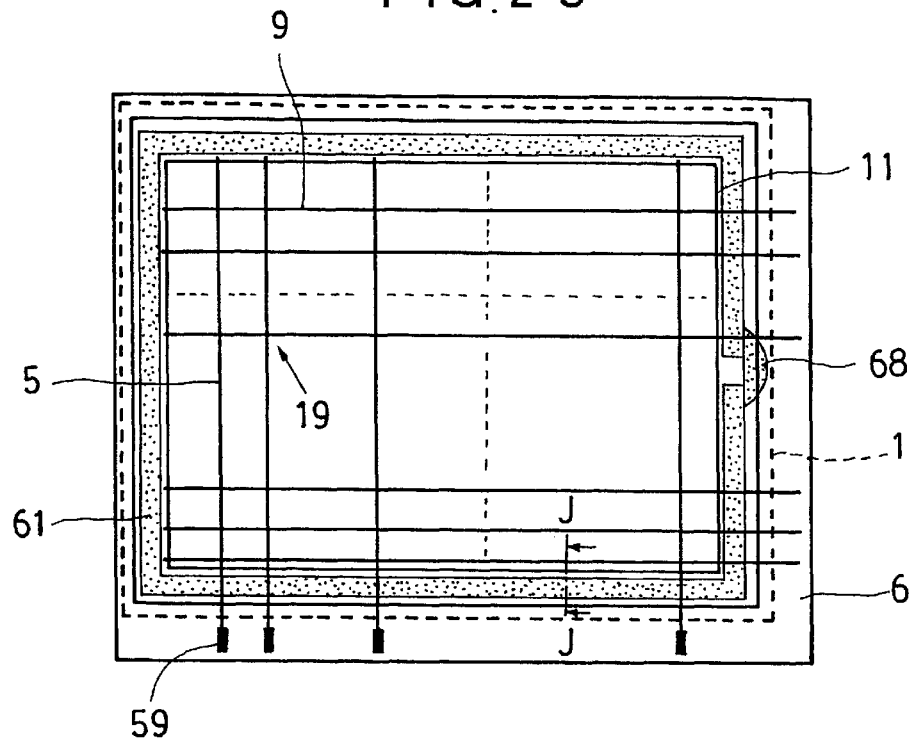
FIG. 25 is an overall plan view of a liquid crystal display panel that is a twelfth embodiment of the invention and FIG. 26 is a sectional view taken along line J—J in FIG. 25.
Figure 26:
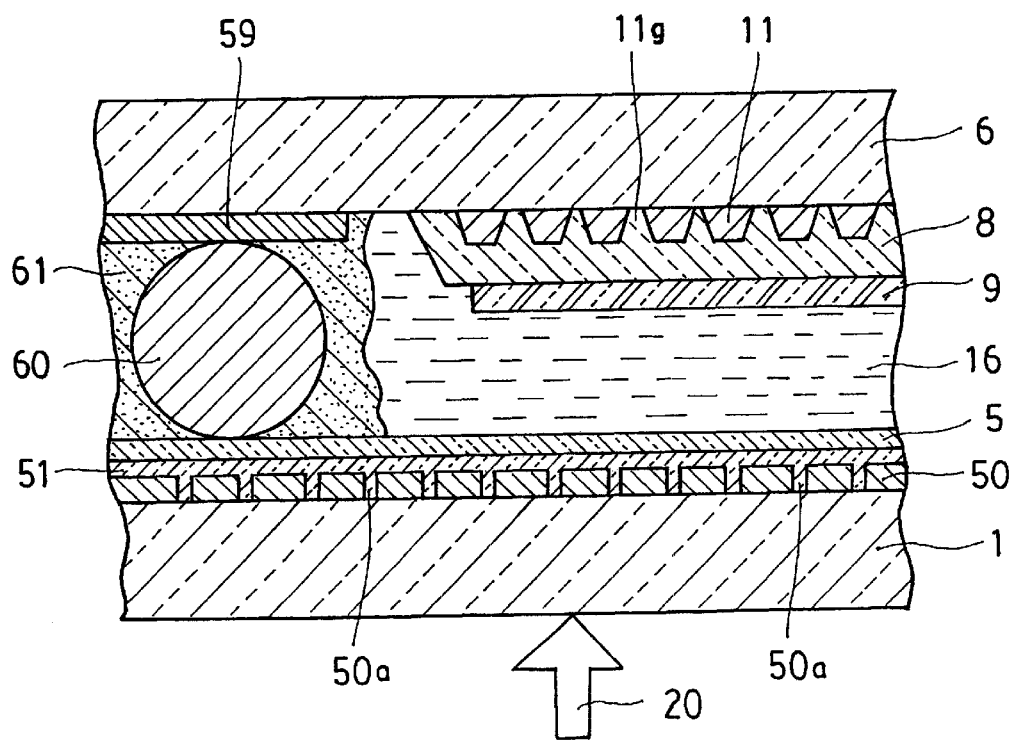

FIG. 25 is an overall plan view of the liquid crystal display panel and FIG. 26 is an enlarged sectional view taken along line J—J in FIG. 25.

As shown in FIG. 25, this liquid crystal display panel has M number of counter electrodes 9 on its second substrate 6 and N number of display electrodes 5 also serving as signal electrodes on its first substrate 1, thereby configuring a liquid crystal display panel of M×N matrix type. In a matrix-type liquid crystal display panel of this type the intersections between the counter electrodes 9 and the display electrodes (signal electrodes) 5 constitute the pixel regions 19.

The pixel regions 19 can be of either the active matrix type provided with switching elements or the passive matrix type not provided with switching elements. While either is usable in this embodiment, the following explanation will be made regarding a passive matrix-type liquid crystal display panel.

As shown in FIG. 26, the first substrate 1 of this liquid crystal display panel is formed thereon with a reflecting film 50 constituted as a metallic film made of gold (Au) film. The reflecting film 50 is formed with multiple openings 50a. The reflecting film 50 and the openings 50a are provided over almost the entire surface of the first substrate 1.

The reflecting film 50 is formed thereon by a printing method with polyimide resin to constitute a protected insulation film (passivation film) 51. The display electrodes 5 doubling as signal electrodes are provided on the proteced insulation film 51 as transparent conductive films. As shown in FIG. 25, the display electrodes 5 are N number of stripe-like electrodes and, as shown in the sectional view of FIG. 26, are provided to near the outer edge of the first substrate 1.

The second substrate 6, which faces the first substrate 1 across a prescribed gap, is provided thereon with the counter electrodes 9 that are M number of stripe-like electrodes made of transparent conductive film.

The second substrate 6 has multiple island-like color filters 11 disposed thereon at positions approximately opposite the openings 50a of the reflecting film 50 provided on the first substrate 1, the color filters 11 are provided with openings 11g at positions not opposite the openings 50a of the reflecting film 50, and an insulated protection layer 8 is provided between the color filters 11 and the counter electrode 9 and inside the openings 11g.

When the liquid crystal display panel is used in a wristwatch, the space for installing electrical connection between the liquid crystal display panel and the circuit board for driving the liquid crystal display panel is extremely limited. Therefore, the end portions of the stripe-like display electrodes 5 on the first substrate 1 and the connection electrodes 59 provided on the opposed surface of the second substrate 6 are electrically connected by a conductive member obtained by mixing conductive particles 60 into the sealing material 61, thereby electrically transferring the display electrodes 5 on the first substrate 1 to the second substrate 6.

Since the adoption of this structure enables the mounting of a circuit board 65 (explained later; see FIG. 28) with respect to the liquid crystal display panel to be effected via a single surface thereof, it greatly reduces the mounting space.

As shown in FIG. 25, a sealing material 61 is formed in the gap between the first substrate 1 and the second substrate 6 at the outer periphery of the first substrate 1. A liquid crystal layer 16 composed of mixed liquid crystal and monomer is injected into this space and the injection port is sealed with a closed element 68.

The liquid crystal layer is then exposed with ultraviolet light through the openings 50a of the reflecting film 50 from the rear surface side of the first substrate 1 to convert its monomer to polymer by crosslinking reaction. The liquid crystal layer 16 can also be exposed with ultraviolet light from the outer surface side of the second substrate 6. In this case, too, the exposure through the openings 11g of the color filter 11 can be effected with substantially no attenuation of the ultraviolet light.

With this configuration, desired display can be effected by introducing external light from outside the second substrate 6, reflecting it from the reflecting film 50 and modifying an optical characteristic of the liquid crystal layer 16 (scattering property) at the pixel regions 19 constituted at the intersections between the display electrodes 5 and the counter electrodes 9 to control the amount of light exiting from the second substrate 6. Since at this time the light entering the liquid crystal display panel and the light exiting the liquid crystal display panel pass through the openings 11g of the color filter 11 with substantially no attenuation, a bright display is possible.

A relatively bright display can also be effected when transmission-type display is effected by auxiliary light 20 from the rear surface side of the first substrate 1 since the large number of openings 50a provided over the whole surface of the reflecting film 50 enable the auxiliary light to enter efficiently.

Figure 27:
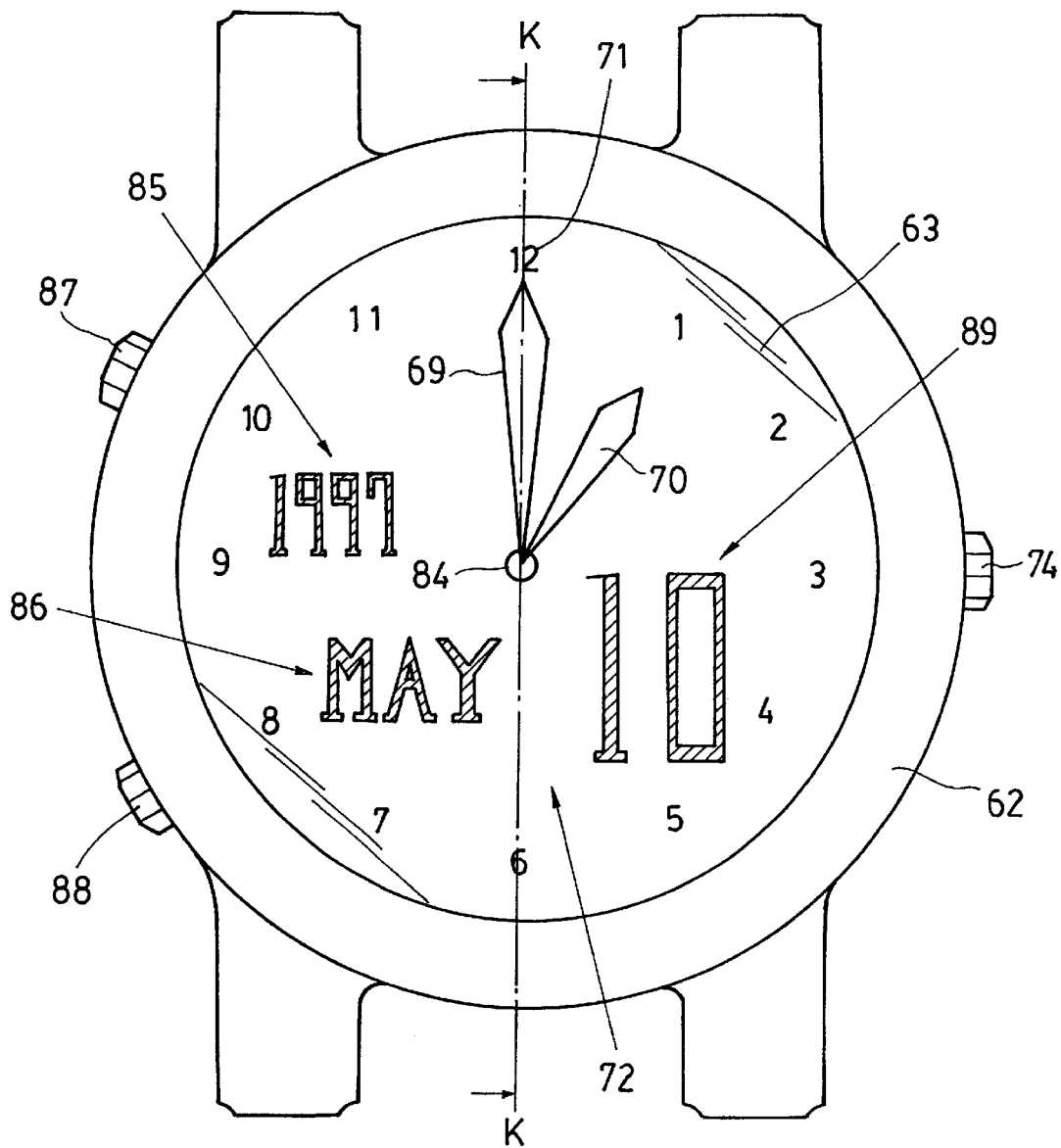
FIG. 27 is a schematic plan view of a combination type wristwatch using the liquid crystal display panel according to the twelfth embodiment of the invention and FIG. 28 is a schematic sectional view taken along line K—K of FIG. 27.
Figure 28:
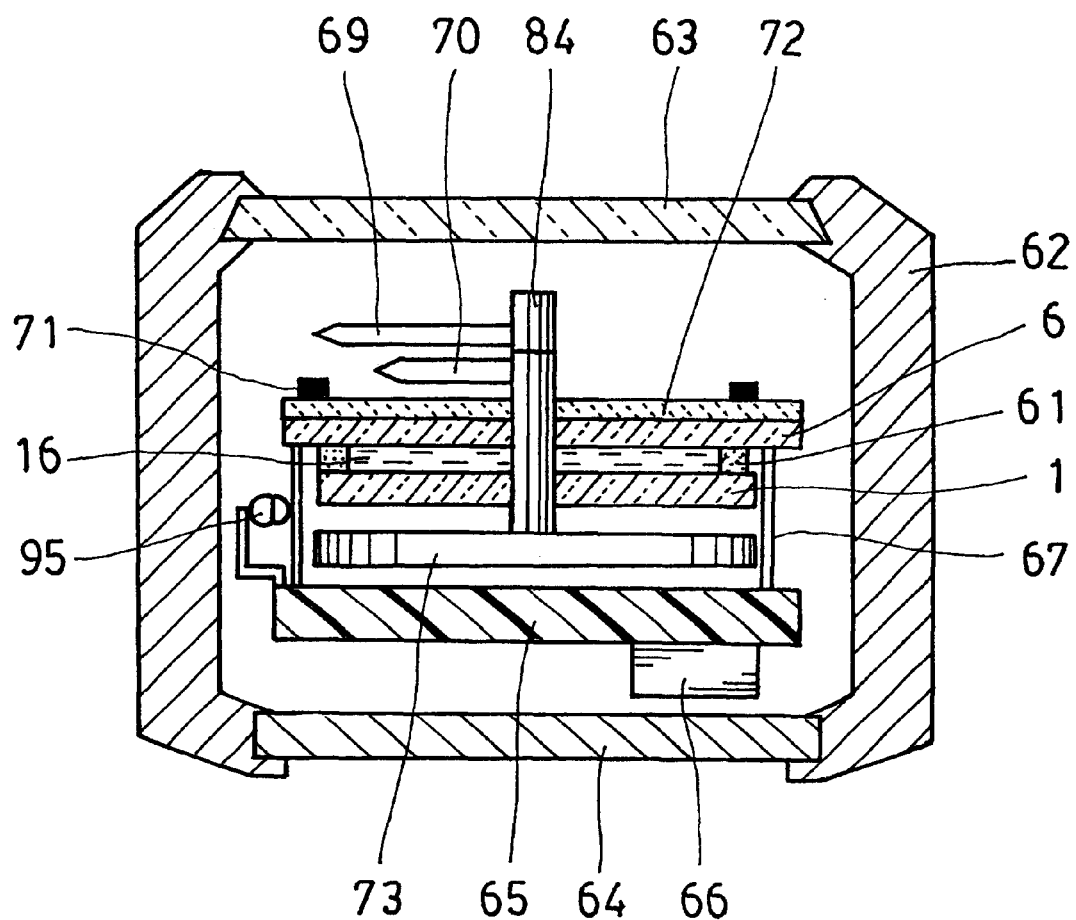

FIG. 27 is a schematic plan view of a combination type wristwatch having both a digital display using this type of liquid crystal display panel and an analog display using a minute hand and an hour hand, while FIG. 28 is a diagrammatic sectional view taken along line K—K of FIG. 27.

The structure of this wristwatch will now be explained with reference to FIGS. 27 and 28.

The watch case 62 of this wristwatch has a glass 63 and a back cover 64. Inside, the second substrate 6, liquid crystal layer 16, sealing material 61 and first substrate 1 of the liquid crystal display panel are disposed in this order from the side of the glass 63.

A shaft 84 for driving a minute hand 69 and an hour hand 70 for analog display passes through the center of the liquid crystal display panel. Although the apertures through which the shaft 84 passes are of course filled, the sealing materials are omitted from the drawings.

An analog watch mechanical drive section 73 for driving the minute hand 69 and the hour hand 70 is provided at the lower surface of the first substrate 1. The circuit board 65, which is equipped with digital circuitry for driving the liquid crystal display panel, and a battery 66 serving as a power source are provided at the underside of the mechanical drive section 73.

A dial 72 having numerals 71 is disposed on the second substrate 6 of the liquid crystal display panel both for showing the time by the analog watch and also for limiting entry and reflection of ultraviolet light to the liquid crystal layer 16 during use as a wristwatch.

Making the dial 72 double as an ultraviolet light shield film for the liquid crystal layer 16 is advantageous when thickness is severely restricted as in the case of a wristwatch.

The circuit board 65 is electrically connected with the liquid crystal display panel by zebra rubbers 67 made by repeatedly overlaying stripe-like conductive layers and nonconductive layers.

Further, as shown in FIG. 27, various operating means are provided on the periphery of the watch case 62. These are a mode switching button 87 for changing the correction mode between the year display 85 and the month display 86 and the day display 89 of the liquid crystal display panel, a setting knob 74 for setting the time and the like, and a light button 88 for switching on the auxiliary light source.

As the auxiliary light source for the liquid crystal display panel, an LED 95 that emits white light is disposed to face into the space between the first substrate 1 of the liquid crystal display panel and the mechanical drive section 73. The LED 95 is connected to the circuit board 65 and is turned on by pressing the light button 88 to supply it with electricity from the battery 66 and a storage capacitor provided in the circuit board 65.

When this wristwatch is illuminated by external light from the side of the glass 63, the external light proceeds to the reflecting film 50 on the first substrate 1 via the route:

glass 63→dial 72→second substrate 6→color filter 11→liquid crystal layer 16.

The light reflected by the reflecting film 50 exits through the glass 63 side along the same route in reverse.

At this time information is supplied from the circuit board 65 to the display electrodes 5 and the counter electrodes 9 of the liquid crystal display panel to modify an optical characteristic (scattering property) of the liquid crystal layer 16 at the pixel regions 19, thereby controlling the amount of light exiting from the pixel regions 19 to produce the desired display and provide the user of the wristwatch with time and other information.

When the LED 95, the internal auxiliary light source of the wristwatch, is turned on because the intensity of the external light is weak, the auxiliary light therefrom enters the liquid crystal display panel through the multiple openings 50a of the metallic shielding film 50 on the first substrate 1, passes through the liquid crystal layer 16 and exits to the glass 63 side to effect the required display of the time etc. The display can be effected in a color close to that when using external light because an LED that emits white light is used as the LED 95.

Thus, when the intensity of the external light is strong, the wristwatch according to this embodiment provides golden reflected light from the reflecting film 50 made of metallic film. Thus the important ornamental function of the wristwatch is enhanced by a display that gives a highly luxurious impression.

Further, owing to the use of a high-molecular scattering-type liquid crystal consisting of a liquid crystal and a polymer as the liquid crystal layer 16, the scattering property during non-display and the high transmittance during display are thoroughly utilized to secure whitish-gold reflected light at non-display regions due to the scattering property of the liquid crystal layer 16 and to enable a golden display with a metallic luster at the display regions.

Moreover, when the external light is weak, display can be effected by using the auxiliary light source.

In the liquid crystal display panel of this embodiment, the first substrate 1 and the second substrate 6 are formed with through-holes for the passage of the shaft 84. It is possible to obtain the outer edge of the display surface clarifying effect by providing many openings 50a in the reflecting film 50 in the vicinity of the through-holes and not providing openings near the peripheral portion of the display region.

What is claimed is:

1. A liquid crystal display panel having a first substrate and a second substrate composed of a transparent material and disposed opposite each other across a gap, multiple display electrodes provided on one of the opposed surfaces of the first and second substrates, a transparent counter electrode provided on the other opposed surface, a region between each display electrode and an opposed counter electrode constituting a pixel region, and a liquid crystal layer filled in the gap between the first substrate and the second substrate, said liquid crystal display panel comprising a reflecting film provided at each pixel region, the reflecting film having a portion whose light transmittance is higher than other portions thereof.

2. The liquid crystal display panel according to claim 1, wherein the portion whose light transmittance is high is an opening in the reflecting film.

3. The liquid crystal display panel according to claim 2, wherein the opening of the reflecting film is embedded with a transparent element.

4. The liquid crystal display panel according to claim 1, further comprising a reflecting film having said high transmittance portions provided at a non-display region apart from the pixel region, the density of these high transmittance portions being higher than that of the high transmittance portions of the reflecting film provided at the pixel region.

5. The liquid crystal display panel according to claim 1, further comprising alignment films having different orientation characteristics provided on each of the opposed inner surfaces of the first substrate and the second substrate, the alignment film provided at a high transmittance portion of the reflecting film and the alignment film provided at other portions having different orientation characteristics.

6. The liquid crystal display panel according to claim 1, wherein the liquid crystal layer is a layer composed of a mixture of a liquid crystal and a crosslinked polymer.

7. The liquid crystal display panel according to claim 6, wherein the liquid crystal layer includes a dye.

8. The liquid crystal display panel according to claim 1, further comprising a color filter between the first substrate and the second substrate.

9. The liquid crystal display panel according to claim 8, further comprising alignment films having different orientation characteristics provided on each of the opposed inner surfaces of the first substrate and the second substrate, the alignment film provided at a high transmittance portion of the reflecting film and the alignment film provided at other portions having different orientation characteristics.

10. The liquid crystal display panel according to claim 8, wherein the liquid crystal layer is a layer composed of a mixture of a liquid crystal and a crosslinked polymer.

11. The liquid crystal display panel according to claim 10, wherein the liquid crystal layer includes a dye.

12. The liquid crystal display panel according to claim 8, wherein the color filter is provided at each pixel region, the color filter having portions whose light transmittance is higher than other portions thereof, and the high transmittance portions of the reflecting film and the high transmittance portions of the color filter are not opposed to each other.

* * * * *